(12) United States Patent
Benmohamed et al.

(10) Patent No.: US 6,795,399 B1
(45) Date of Patent: Sep. 21, 2004

(54) LINK CAPACITY COMPUTATION METHODS AND APPARATUS FOR DESIGNING IP NETWORKS WITH PERFORMANCE GUARANTEES

(75) Inventors: Lotfi Benmohamed, Freehold, NJ (US); Subrahmanyam Dravida, Groton, MA (US); Paramasiviah Harshavardhana, Marlboro, NJ (US); Wing Cheong Lau, Eatontown, NJ (US); Ajay Kumar Mittal, Edison, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 805 days.

(21) Appl. No.: 09/198,727

(22) Filed: Nov. 24, 1998

(51) Int. Cl.[7] .................................................. H04L 5/00
(52) U.S. Cl. ........................ 370/235; 370/252; 370/255; 709/226; 709/238
(58) Field of Search ................................. 370/229, 235, 370/237, 238, 254, 255, 465, 912, 252; 379/901; 709/223, 226, 233, 234, 235, 238

(56) References Cited

PUBLICATIONS

G. Anastasi, M. La Porta, and L. Lenzini. Delay analysis of a worst–case model of the MetaRing MAC protocol with local fairness. Computer Communications 20 (1997) 671–680.*

R.G. Garroppo, S. Giordano, and M. Pagano. A CAC Algorithm for Per–VC Queueing Systems Loaded by Fractal Traffic. Global Telecommunications Conference—Globecom '99: High Speed Networks. IEEE. 1999. pp. 1610–1615.*

V.P. Kumar et al., "Beyond Best Effort: Router Architectures for the Differentiated Services of Tomorrow's Internet," IEEE Comm. Magazine, vol. 36, No. 5, pp. 152–164, May 1998.

B. Suter et al., "Design Considerations for Supporting TCP with Per–Flow Queuing," Proc. IEEE Infocom, pp. 299–306, San Francisco, Mar. 1998.

S. Floyd et al., "On Traffic Phase Effects in Packet–Switched Gateways," Internetworking: Research and Experience, vol. 3, No. 3, pp. 115–156, Sep. 1992.

S. Floyd, "Connections with Multiple Congested Getaways in Packet–Switched Networks, Part I: One–Way Traffic," ACM Computer Comm. Review, vol. 21, No. 5, pp. 30–47, Oct. 1991.

* cited by examiner

*Primary Examiner*—Hassan Kizou
*Assistant Examiner*—Joe Logsdon

(57) ABSTRACT

Methods and apparatus are provided for designing IP networks with substantially improved performance as compared to existing IP networks such as, for example, those networks designed under best-effort criteria. Particularly, the invention includes methods and apparatus for: computing worst-case and optimistic link capacity requirements; optimizing network topology; and determining router placement within a network.

42 Claims, 15 Drawing Sheets

|  | DESTINATION NODE I.D. | | | | | | | | | | | |
|---|---|---|---|---|---|---|---|---|---|---|---|---|
|  | | 1 | 2 | 3 | 4 | 5 | 6 | 7 | 8 | 9 | 10 | 11 | 12 |
| | 1 | 0 | 34 | 19 | 76 | 76 | 22 | 20 | 74 | 40 | 27 | 64 | 30 |
| | 2 | 34 | 0 | 18 | 71 | 71 | 21 | 19 | 70 | 38 | 26 | 60 | 28 |
| | 3 | 19 | 18 | 0 | 38 | 38 | 11 | 10 | 38 | 20 | 14 | 32 | 15 |
| | 4 | 82 | 78 | 43 | 0 | 172 | 50 | 46 | 169 | 91 | 62 | 146 | 68 |
| | 5 | 82 | 78 | 43 | 172 | 0 | 50 | 46 | 168 | 91 | 62 | 145 | 67 |
| SOURCE | 6 | 22 | 21 | 12 | 45 | 45 | 0 | 12 | 44 | 24 | 16 | 38 | 18 |
| NODE I.D. | 7 | 20 | 19 | 11 | 41 | 41 | 12 | 0 | 40 | 22 | 15 | 35 | 16 |
| | 8 | 81 | 76 | 42 | 168 | 168 | 49 | 45 | 0 | 89 | 60 | 142 | 66 |
| | 9 | 40 | 38 | 21 | 84 | 84 | 25 | 23 | 83 | 0 | 30 | 71 | 33 |
| | 10 | 27 | 25 | 14 | 56 | 56 | 17 | 15 | 55 | 30 | 0 | 47 | 22 |
| | 11 | 68 | 64 | 36 | 142 | 141 | 42 | 38 | 139 | 75 | 51 | 0 | 56 |
| | 12 | 29 | 28 | 16 | 61 | 61 | 18 | 17 | 60 | 32 | 22 | 52 | 0 |

FIG. 10A

| CONFIGURATION | NORMALIZED COST | NETWORK-WIDE OVERBUILD FACTOR ($\kappa$) |
|---|---|---|
| WFQ/LQD | 1.00 | 1.12 |
| FIFO/RED, $\overline{c}_\ell^{FIFO}$ ($H^{worst}$) | 3.69 | 4.72 |
| FIFO/RED, $\overline{c}_\ell^{FIFO}$ ($H^{hop}$) | 2.57 | 3.33 |
| FIFO/RED, $\underline{c}_\ell^{FIFO}$ ($H^{hop}$) | 2.40 | 3.15 |
| FIFO/RED, $\overline{c}_\ell^{FIFO}$ ($H^{one}$) | 1.77 | 2.25 |
| FIFO/RED, $\underline{c}_\ell^{FIFO}$ ($H^{one}$) | 1.70 | 2.17 |
| FIFO/RED, $\overline{c}_\ell^{FIFO}$ ($H^{best}$) | 1.26 | 1.61 |

FIG. 10B

| CONFIGURATION | NORMALIZED COST | NETWORK-WIDE OVERBUILD FACTOR ($\kappa$) |
|---|---|---|
| WFQ/LQD | 1.00 | 1.04 |
| FIFO/RED, $\overline{c_Q^{FIFO}}$ ($H^{worst}$) | 11.6 | 13.33 |
| FIFO/RED, $\overline{c_Q^{FIFO}}$ ($H^{hop}$) | 7.26 | 8.55 |
| FIFO/RED, $\underline{c_Q^{FIFO}}$ ($H^{hop}$) | 6.24 | 7.35 |
| FIFO/RED, $\overline{c_Q^{FIFO}}$ ($H^{one}$) | 3.47 | 4.00 |
| FIFO/RED, $\underline{c_Q^{FIFO}}$ ($H^{one}$) | 3.03 | 3.48 |
| FIFO/RED, $\overline{c_Q^{FIFO}}$ ($H^{best}$) | 2.19 | 2.60 |

FIG. 10C

| CONFIGURATION | NORMALIZED COST | AVERAGE HOP-COUNT |
|---|---|---|
| DELOADING ONLY | 1.00 | 2.68 |
| CAPACITY-ONLY AUGMENTATION WITH CONNECTIVITY COMPLETION, FOLLOWED BY DELOADING | 1.31 | 3.73 |
| THRESHOLD-CONTROLLED STRAGGLER CONVERSION WITH CONNECTIVITY COMPLETION, FOLLOWED BY DELOADING | 1.00 | 2.68 |
| THRESHOLD-CONTROLLED STRAGGLER CONVERSION WITHOUT CONNECTIVITY COMPLETION, FOLLOWED BY DELOADING | 1.00 | 2.68 |
| DIRECT STRAGGLER CONVERSION WITH CONNECTIVITY COMPLETION, FOLLOWED BY DELOADING | 1.00 | 2.68 |
| DIRECT STRAGGLER CONVERSION WITHOUT CONNECTIVITY COMPLETION, FOLLOWED BY DELOADING | 1.00 | 2.68 |

| CONFIGURATION | NORMALIZED COST | NETWORK-WIDE OVERBUILD FACTOR (κ) | AVERAGE HOP-COUNT |
|---|---|---|---|
| WFQ/LQD | 1.00 | 1.07 | 2.7 |
| FIFO/RED, $\overline{c}_q^{FIFO}$ ($H^{worst}$) | 3.79 | 4.72 | 2.4 |
| FIFO/RED, $\overline{c}_q^{FIFO}$ ($H^{hop}$) | 2.63 | 3.22 | 2.5 |
| FIFO/RED, $\underline{c}_q^{FIFO}$ ($H^{hop}$) | 2.51 | 3.07 | 2.5 |
| FIFO/RED, $\overline{c}_q^{FIFO}$ ($H^{one}$) | 1.82 | 2.25 | 2.4 |
| FIFO/RED, $\underline{c}_q^{FIFO}$ ($H^{one}$) | 1.75 | 2.17 | 2.4 |
| FIFO/RED, $\overline{c}_q^{FIFO}$ ($H^{best}$) | 1.28 | 1.42 | 2.8 |

FIG. 10F

| CONFIGURATION | NORMALIZED COST | NETWORK-WIDE OVERBUILD FACTOR (κ) | AVERAGE HOP-COUNT |
|---|---|---|---|
| WFQ/LQD | 1.00 | 1.04 | 3.8 |
| FIFO/RED, $\overline{c}_q^{FIFO}$ ($H^{worst}$) | 11.18 | 11.72 | 4.0 |
| FIFO/RED, $\overline{c}_q^{FIFO}$ ($H^{hop}$) | 6.87 | 6.52 | 4.5 |
| FIFO/RED, $\underline{c}_q^{FIFO}$ ($H^{hop}$) | 6.14 | 5.82 | 4.5 |
| FIFO/RED, $\overline{c}_q^{FIFO}$ ($H^{one}$) | 3.33 | 3.44 | 4.1 |
| FIFO/RED, $\underline{c}_q^{FIFO}$ ($H^{one}$) | 2.97 | 3.06 | 4.1 |
| FIFO/RED, $\overline{c}_q^{FIFO}$ ($H^{best}$) | 2.05 | 1.95 | 4.5 |

| NUMBER OF WFQ/LQD ROUTERS USED | OPTIMAL SET OF FIFO/RED ROUTERS TO BE REPLACED | NORMALIZED NETWORK COST (J) BASED ON $\bar{c}_\ell^{FIFO}(H^{worst})$ |
|---|---|---|
| 0 | N/A | 1.00 |
| 2 | 8, 10 | 0.88 |
| 3 | 8, 10, 11 | 0.83 |
| 4 | 3, 8, 10, 11 | 0.76 |
| 5 | 3, 5, 8, 10, 11 | 0.63 |
| 6 | 3, 4, 5, 8, 10, 11 | 0.56 |
| 7 | 3, 4, 5, 8, 10, 11, 12 | 0.51 |
| 8 | 3, 4, 5, 6, 8, 10, 11, 12 | 0.46 |
| 9 | 3, 4, 5, 6, 8, 9, 10, 11, 12 | 0.41 |
| 10 | 3, 4, 5, 6, 7, 8, 9, 10, 11, 12 | 0.36 |
| 11 | 1, 3, 4, 5, 6, 7, 8, 9, 10, 11, 12 | 0.31 |
| 12 | ALL | 0.27 |

| % OF WFQ/LQD ROUTERS USED | NORMALIZED NETWORK COST (J) BASED ON $\bar{c}_\ell^{FIFO}(H^{worst})$ |
|---|---|
| 0 | 1.00 |
| 10 | 0.85 |
| 20 | 0.73 |
| 30 | 0.60 |
| 40 | 0.50 |
| 50 | 0.40 |
| 60 | 0.27 |
| 70 | 0.22 |
| 80 | 0.16 |
| 90 | 0.11 |
| 100 | 0.10 |

400# LINK CAPACITY COMPUTATION METHODS AND APPARATUS FOR DESIGNING IP NETWORKS WITH PERFORMANCE GUARANTEES

CROSS REFERENCE TO RELATED APPLICATIONS

This application is related to two concurrently filed U.S. patent applications respectively identified as Ser. No. 09/198,728 and entitled "Network Topology Optimization Methods and Apparatus For Designing IP Networks With Performance Guarantees;" and Ser. No. 09/198,729 and entitled "Router Placement Methods and Apparatus For Designing IP Networks With Performance Guarantees," now issued as U.S. Pat. No. 6,240,463.

FIELD OF THE INVENTION

The invention relates to methods and apparatus for designing packet-based networks and, more particularly, for designing IP (Internet Protocol) networks with performance guarantees.

BACKGROUND OF THE INVENTION

Traditional IP networks are built with very limited capacity planning and design optimization. These networks can only provide a best-effort service without performance guarantees. However, customer expectations can only be met if IP networks are designed to provide predictable performance. In particular, network service providers have to support bandwidth guarantees for their virtual private network (VPN) customers.

In addition, included in any network design considerations, is the fact that there are several types of network routers that may be used in a given network. For instance, a packet switch such as Lucent's PacketStar™ (from Lucent Technologies, Inc. of Murray Hill, N.J.) IP Switch supports novel traffic scheduling and buffer management capabilities, including per-flow queuing with weighted fair queuing (WFQ) and longest-queue drop (LQD), which enable minimum bandwidth guarantees for VPNs while achieving a very high level of resource utilization. It is also known that existing legacy routers, on the other hand, do not support adequate flow isolation and their first-in-first-out (FIFO) scheduling, even when combined with the random early detection (RED) buffer management policy, results in little control over the bandwidth sharing among VPNs and throughput is mostly dictated by the dynamic properties of TCP (Transmission Control Protocol), which is the dominant transport protocol used in IP networks.

Accordingly, there is a need for a network design tool that permits users, i.e., network designers, to design IP networks having the same (homogeneous) or different (heterogeneous) types of routers which provide substantial performance guarantees for a variety of applications such as, for example, VPN. Specifically, there is a need for a design tool which: automatically computes worst-case and optimistic link capacity requirements based on a designer's specifications; optimizes the network topology; and determines optimal router placement in the network.

SUMMARY OF THE INVENTION

The present invention provides methods and apparatus for designing IP networks with substantially improved performance as compared to existing IP networks such as, for example, those networks designed under best-effort criteria. Particularly, the invention includes methods and apparatus for: computing worst-case and optimistic link capacity requirements; optimizing network topology; and determining router placement within a network.

In a first aspect of the invention, methods and apparatus are provided for computing link capacity requirements of the links of the network. Particularly, upper and lower link capacity bounds are computable to provide the user of the design methodology with worst-case and optimistic results as a function of various design parameters. That is, given a network topology, specific IP demands and network delays, the design methodology of the invention permits a user to compute link capacity requirements for various network congestion scenarios, e.g., network-wide multiple bottleneck events, for each link of the given network. In this design methodology, the user may design the IP network, given a specific topology, without the need to know where specific bottlenecks are located within the specific network. Also, the link capacity computation methods and apparatus of the invention handle the case where there are one or more connections within a given demand.

In a second aspect of the invention, methods and apparatus are provided for optimizing the network topology associated with a network design. Particularly, an optimal network topology is formulated according to the invention which attempts to reduce overall network costs. In one embodiment, an iterative augmentation methodology is provided which attempts to reduce network costs by packing small-demands on the spare capacity of some existing links rather than introducing additional poorly utilized links into the network topology. In another embodiment, an iterative deloading methodology is provided which attempts to reduce network costs by removing identified links which are lightly loaded to form an optimal network topology.

In a third aspect of the invention, methods and apparatus are provided for determining the placement of WFQ/LQD routers in order to replace FIFO/RED routers in an existing network such that network cost savings are maximized. The methodology of the invention accomplishes such determination by employing a mixed integer programming model.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 10A through 10H are tabular examples and results associated with case studies performed with respect to the present invention; and FIG. 11 is a graph illustrating dynamics of TCP congestion window.

DETAILED DESCRIPTION OF PREFERRED EMBODIMENTS

Figure 1:
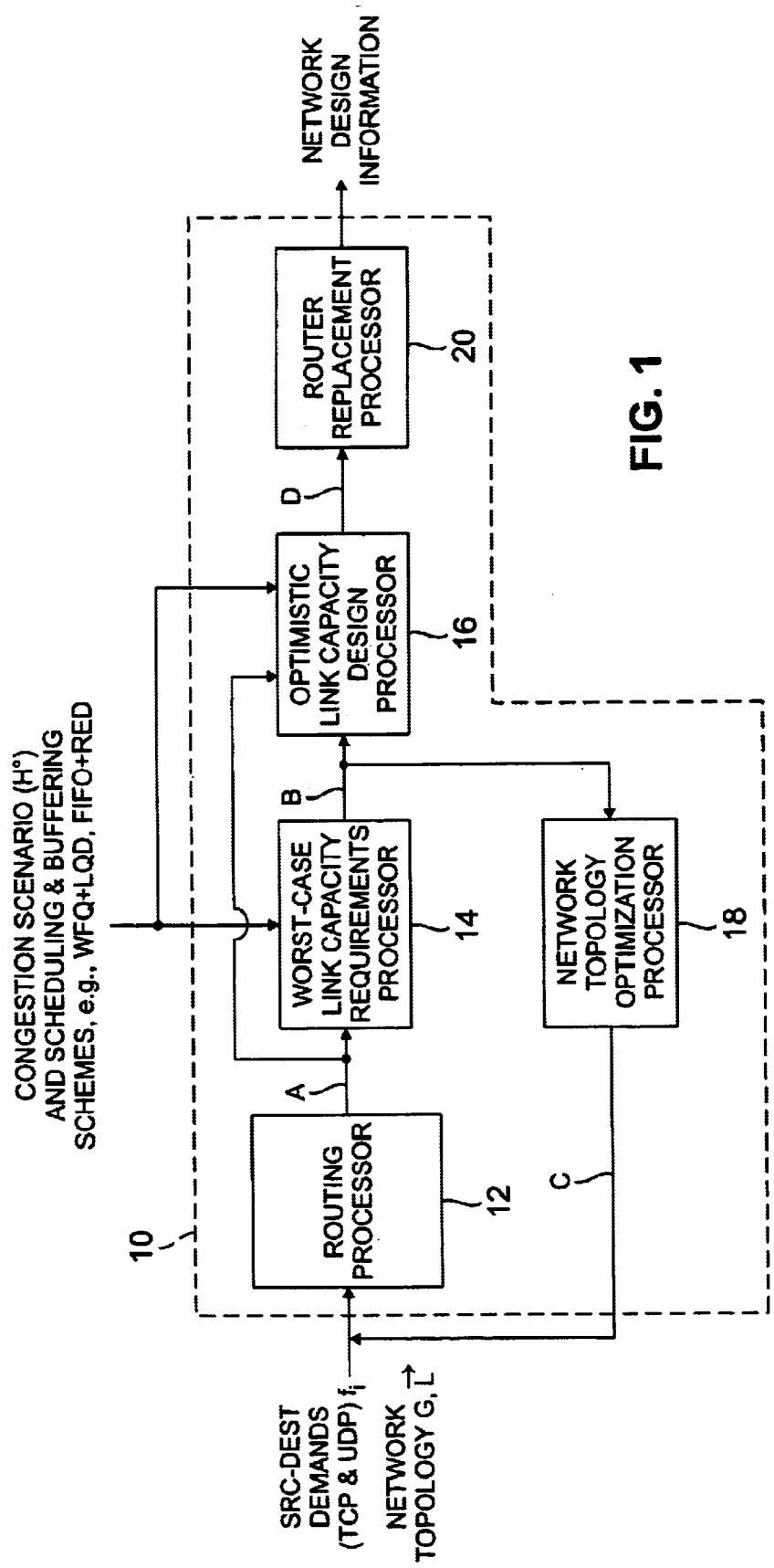
FIG. 1 is a block diagram of an IP network design system according to an embodiment of the present invention.

The invention will be described below in the context of a VPN framework; however, it should be understood that the invention is not limited to such applications or system architectures. Rather, the teachings described herein are applicable to any type of packet-based network including any IP applications and system architectures. Further, the term "processor" as used herein is intended to include any processing device, including a CPU (central processing unit) and associated memory. The term "memory" as used herein is intended to include memory associated with a processor or CPU, such as RAM, ROM, a fixed memory device (e.g., hard drive), or a removable memory device (e.g., diskette). In addition, the processing device may include one or more input devices, e.g., keyboard, for inputting data to the processing unit, as well as one or more output devices, e.g., CRT display and/or printer, for providing results associated with the processing unit. It is also to be understood that various elements associated with a processor may be shared by other processors. Accordingly, the software instructions or code for performing the methodologies of the invention, described herein, may be stored in one or more of the associated memory devices (ROM, fixed or removable memory) and, when ready to be utilized, loaded into RAM and executed by a CPU. Further, it is to be appreciated that, unless otherwise noted, the terms "node," "switch," and "router" as used herein are interchangeable.

As mentioned, optimal IP network design with quality of service (QoS) guarantees has been a critical open research problem. Indeed, with the commercialization of the Internet and the ever-increasing dependency of business on the Internet, IP networks are becoming mission-critical and the best-effort service in today's IP networks is no longer adequate. The present invention provides methodologies for designing IP networks that provide bandwidth and other QoS guarantees to such networks as, for example, VPNs. For example, given the network connectivity and the traffic demand, the design procedures of the invention generate the network topology and the corresponding link capacities that meet the demand when all the routers in the subject network have WFQ/LQD capabilities, such as PacketStar IP Switch. The same may be done in a second design for the case of legacy routers using the FIFO/RED scheme. A comparison may then be performed with respect to quantified savings in terms of network cost. To accomplish this comparison, models for TCP throughput performance under FIFO scheduling with RED are used. In both of the above cases, the routing constraints imposed by the Open Shortest Path First (OSPF) routing protocol are taken into account. The present invention also addresses the router placement problem for migrating a conventional router network to a guaranteed performance network via replacement of legacy routers with WFQ/LQD routers. In particular, the methodologies of the invention identify the strategic locations in the network where WFQ/LQD routers need to be introduced in order to yield the maximum savings in network cost.

FIG. 1 illustrates a block diagram of an embodiment of an IP network design system according to the present invention. The IP network design system 10, itself, includes several interconnected functional processors, namely: a routing processor 12; a worst-case link capacity requirements processor 14, operatively coupled to the routing processor 12; an optimistic link capacity design processor 16, operatively coupled to the worst-case link capacity requirements processor 14; a network topology optimization processor 18, operatively coupled to the worst-case link capacity requirements processor 14; and a router replacement processor 20, operatively coupled to the optimistic link capacity design processor 16. It is to be appreciated that the functional processors 12 through 20, illustrated in FIG. 1, may be implemented via respective dedicated processing devices (e.g., CPUs and associated memories) or collectively via one or more processing devices. That is, the IP network design system 10 of the invention may be implemented via a single processing device or multiple processing devices.

As input to the IP network design system 10 and its associated methodologies, i.e., in the form of data signals stored or input by the user of the design system to the processing device(s), an initial backbone network topology is provided in the form of a graph G=(V, E) where V is the set of nodes corresponding to the points of presence (POPs where routers are located) and E is the set of links which can be used to provide direct connectivity between the POPs. It is to be appreciated that, as will be explained, an initial network topology may be provided by the network topology optimization processor 18. Also, given as input to the system is the mileage vector $\vec{L}=[L_1, L_2, \ldots, L_{|E|}]$ where $L_l$ is the actual length of link l∈E. A set of point-to-point IP traffic demands is also given as input to the design system 10 where each IP-flow demand i is specified by $f_i$, given as a 6-tuple:

$$f_i=(s_i, t_i, a_i, n_i, d_i, \hat{r}_i)$$

where $s_i$ and $t_i$ are the source and destination nodes in V, respectively, $a_i$ is the transport protocol type (either TCP or UDP (Use Datagram Protocol)), $n_i$ is the number of TCP or UDP connections within the flow, $d_i$ is the aggregated minimum throughput requirement for the flow assumed to be bi-directional, and $\hat{r}_i$ is the minimum between the access link speed from the source customer site to $s_i$ and the access link speed from the destination customer site to $t_i$. Let F be the set which contains all the $f_i$'s, and $F_l$ be the subset of F whose elements are those demands which are routed through link l according to some routing algorithm R. It is to be appreciated that the selected routing algorithm R is executed by the routing processor 12 (FIG. 1) based on such above inputs thereto. The output of the routing processor 12, denoted by reference designation A in FIG. 1, is routing information as a function of the demand flow and network topology, that is, the flow (traffic) found on each link or the $f_i$'s passing through each link.

The design system of the invention focuses on shortest-path routing similar to that used in the standard OSPF protocol. The shortest paths are computed based on a given link metric $l_l$ for each link l in E. Let $\vec{l}=[l_1, l_2, \ldots, l_{|E|}]$ be the vector of these link metrics. It is assumed that tie-breaking is used such that there is a unique route between any source and destination node. Let the capacity of link l be $C_l$ which is expressed in the unit of trunk capacity (e.g. DS3, OC3, etc.) with the assumption that a single value of trunk size (or capacity) is used throughout the network. Let $\vec{C}=[C_1, C_2, \ldots, C_{|E|}]$ denote the vector of link capacities.

Generally, the network design system 10 and associated methodologies address, inter alia, the following capacity assignment problem: find the required capacity vector $\vec{C}$ so that the throughput demand requirements given by F are satisfied while minimizing the total network cost. Note that by assigning zero capacity to a subset of links in E, the topology of G can, in effect, be changed by reducing its connectivity and subsequently influence the routing of the demands. As such, as will be discussed, the IP network design methodologies of the invention also include a topology optimization component.

Figure 2:
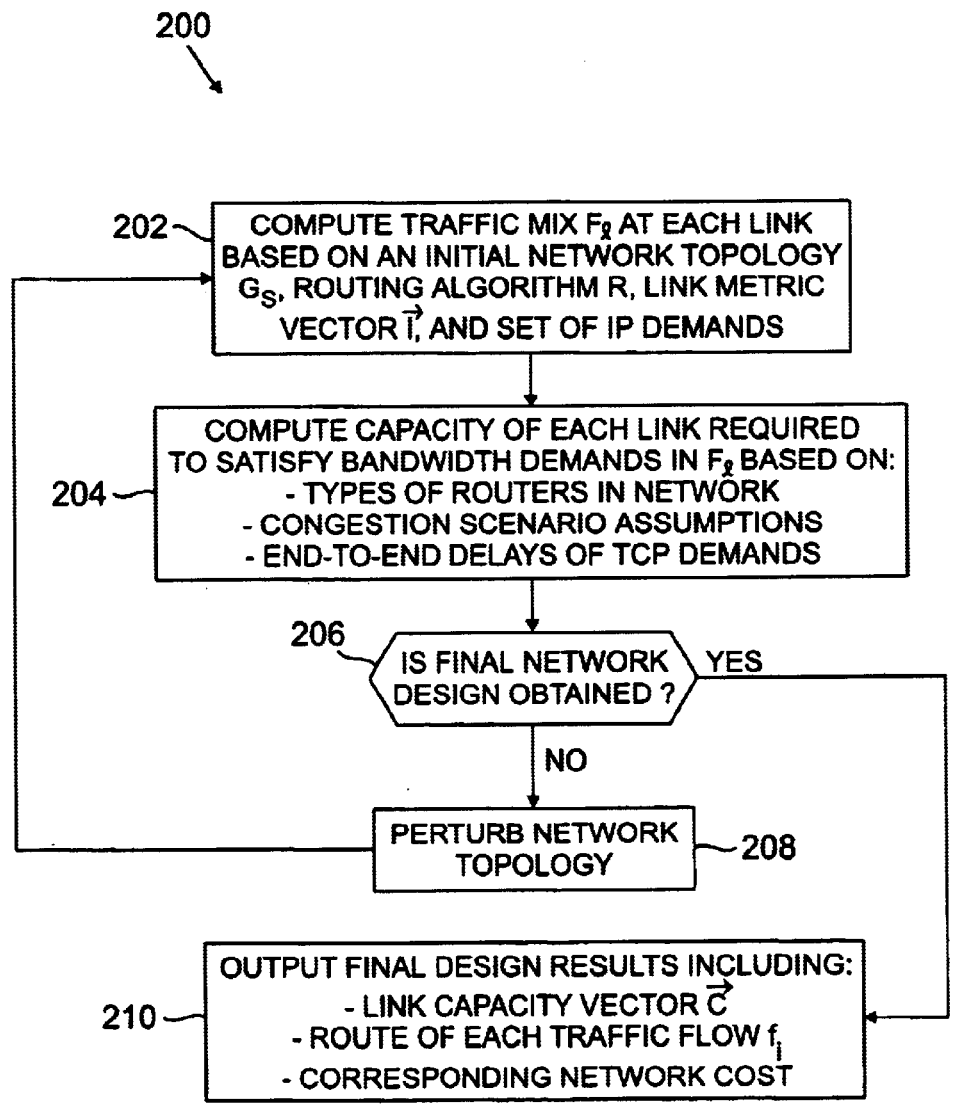
FIG. 2 is a flow chart of a design methodology according to an embodiment of the present invention.

Referring to FIG. 2, one embodiment of a general design algorithm 200 of the system proceeds as follows. First, the traffic mix $F_l$ at each link is computed (by routing processor 12) based on an initial network topology $G_s$ (from optimization processor 18) which is a subgraph of G, the routing algorithm R, the link metric vector $\vec{1}$, and the set of IP demands F (step 202). Second, the capacity of each link required to satisfy the bandwidth demands in $F_l$ is computed (by link capacity requirements processors 14 and 16) based on the type(s) of routers in the network, the different assumptions on congestion scenario, and in some cases the end-to-end delays of the TCP demands (step 204). Third, the design system determines whether the final network design (by optimization processor 18) is obtained (step 206). If not, in step 208, the network topology is perturbed (by optimization processor 18) and the new network cost is evaluated in accordance with steps 202 and 204. This design iteration is then repeated until the final network design is obtained. The results of the final design are output (step 210), e.g., in the form of information displayed to the user of the design system, including: (1) the vector $\vec{C}$; (2) the route of each traffic flow $f_i$; and (3) the corresponding network cost.

One of the important features of the methodologies of the invention is that both the homogeneous case, i.e. for networks with only conventional FIFO/RED routers or those using purely WFQ/LQD routers, and the heterogeneous case, i.e., using a mixture of both router types, can be accommodated in the design. As such, these methodologies of the present invention also serve as the core engine to find the optimal placement of WFQ/LQD routers in a legacy FIFO/RED router network.

In order to facilitate reference to certain aspects of the invention, the remainder of the detailed description is divided into the following sections. In Section 1.0, estimation of required link bandwidth in order to satisfy any given TCP/UDP throughput requirements according to the invention is explained. It is to be appreciated that the worst-case link capacity design requirements processor 14 and the optimistic link capacity design processor 16 are employed in this aspect of the invention. Network topology optimization according to the invention, as performed by the network topology optimization processor 18, is described in Section 2.0. In Section 3.0, optimal placement of WFQ/LQD routers in a heterogeneous router network according to the invention, as computed by the router replacement processor 20, is explained. Sample IP network design cases are given in Section 4.0. Section 5.0 provides an explanation of throughput allocation under FIFO/RED with reference to Section 1.0. Section 6.0 provides an explanation of NP-Hardness with reference to the router placement embodiment of the invention explained in Section 3.0. Also, for further ease of reference, certain of these sections are themselves divided into subsections.

1.0 Link Capacity Computations

Since one focus of the methodologies of the present invention is to support bandwidth guarantees for IP-based VPNs, where TCP is the primary transport protocol in use, the present invention determines how much capacity must any given link in the network have in order to guarantee a given set of demands each associated with a group of TCP connections routed through this link. Typically, each group of connections belongs to a different VPN and represents one of the VPN's point-to-point demands. The answer to this question depends primarily on the packet scheduling and the buffer management strategies used in the routers of the network. The most popular one in the Internet today uses FIFO scheduling with RED as the packet dropping policy. Advanced next-generation routers such as PacketStar IP Switch, however, use a WFQ scheduler with longest queue drop (LQD) policy to provide bandwidth guarantees at the VPN level with the fairness and isolation properties at the flow (or connection) level. As will be evident, conventional FIFO combined with RED (FIFO/RED) typically cannot provide bandwidth guarantees unless it is designed with larger link capacity than WFQ combined with LQD (WFQ/LQD).

It is to be appreciated that the link capacity processors 14 and 16 compute the link capacity requirements given the demand flow requirements and the selected scheduling and buffering schemes. Below, the design considerations at issue due to the use of the FIFO/RED scheme are discussed, as well as the methodologies implemented by the link capacity design processors 14 and 16 for addressing these design issues. Then, the design considerations for the WFQ/LQD scheme are discussed, the link capacity requirements of which may be computed by either of the processors 14 and 16. Lastly, embodiments of several link capacity design methods according to the invention are explained in detail.

1.1 First-In-First-Out with Random Early Detection (FIFO/RED)

Consider a set $F_l$ of TCP connections which are routed through a bottleneck link l of capacity $c_l^{FIFO}$. Under FIFO/RED and the assumption that each TCP source is greedy and operates in a congestion avoidance regime, it can be shown, as explained in Section 5.0 below, based on results from: S. Floyd, "Connections with Multiple Congested Gateways in Packet-Switched Networks Part 1:One-way Traffic," ACM Computer Comm. Review, Vol. 21, No. 5, pp. 30–47 (October 1991); and M. Mathis, J. Semke, J. Mahdavi, and T. Ott, "The Macroscopic Behavior of the TCP Congestion Avoidance Algorithm," ACM Computer Comm. Review, Vol.27, No.3, pp.67–82 (July 1997), that the share of the link capacity that any given connection $i \in F_l$ obtains is given by:

$$r_i^l = \frac{w_i}{\sum_{j \in F_l} w_j} c_l^{FIFO}, \quad w_i = \frac{1}{\tau_i \sqrt{h_i}} \qquad (1)$$

where $\tau_i$ and $h_i$ are the round trip delay (RTD) and the number of congested links in the path of connection i, respectively. A congested link refers to a link having a high enough load that its queue experiences packet losses, in contrast to a non-congested link which has zero packet loss. In other words, the link capacity is shared among the competing TCP connections in proportion to their weight which is given in equation (1) as the inverse of the product of the round trip delay $\tau$ and the square root of h. Note the following fundamental difference between FIFO/RED and WFQ/LQD. In both cases the link share of any connection is proportional to its weight. In WFQ/LQD, as will be explained below, the connection's weight is under the network operator's control and can be set arbitrarily. However, in FIFO/RED, the weight is dictated by the characteristics of the connection's path, namely τ and h, which to a large extent are not controllable.

Each point-to-point demand i of a given VPN actually corresponds to a number of TCP connections, each having the same weight $w_i$ since they all follow the same shortest path characterized by $\tau_i$ and $h_i$. Let $n_i$ be the number of TCP connections that make up demand i, $i \epsilon F_l$, It follows from equation (1) that the link share obtained by demand i is now given by:

$$r_i^l = \frac{w_i}{\sum_{j \in F_l} w_j} c_l^{FIFO}, w_i = \frac{n_i}{\tau_i \sqrt{h_i}} \quad (2)$$

Assuming that the number of TCP connections $n_i$ within a given demand i is proportional to the actual demand value $d_i$, equation (2) becomes:

$$r_i^l = \frac{w_i}{\sum_{j \in F_l} w_j} c_l^{FIFO} \quad (3)$$

$$w_i = \frac{d_i}{\tau_i \sqrt{h_i}} \quad (4)$$

In order to have a link capacity $c_l^{FIFO}$ that meets the demands, we require that $r_i^l \geq d_i$, $\forall i \epsilon F_l$, which implies that the minimum link capacity capable of meeting all demands is given by:

$$c_l^{FIFO} = \max_{i \in F_l} \left\{ d_i \frac{\sum_{j \in F_l} w_j}{w_i} \right\} \quad (5)$$

with $w_i$, $i \epsilon F_l$, given by equation (4). The link capacity $c_l^{FIFO}$ is obviously greater or equal to the sum of all demands:

$$c_l^{FIFO} \geq \sum_{i \in F_l} d_i$$

Moreover, if i* is the demand that achieves the maximum in equation (5), then combining equation (3) and equation (5) we obtain:

$$r_i^l = \frac{w_i}{\sum_{j \in F_l} w_j} d_{i^*} \frac{\sum_{j \in F_l} w_j}{w_{i^*}} = \frac{w_i}{w_{i^*}} d_{i^*}$$

which implies that $r_{i^*}^l = d_{i^*}$, and $r_i^l \geq d_i \forall i \epsilon F_l$. In other words, i* is the demand that is allocated its exact requirement and all other demands are allocated a bandwidth greater or equal to their required value.

The parameters involved in the computation of the required link capacity according to equation (5) are $d_i$, $\tau_i$, and $h_i$, $i \epsilon F_l$. The demands $d_i$ are given, the fixed part of the delays $\tau_i$ (propagation delays) are determined from the shortest path and are expected to be dominant in the wide area (an average queuing delay component could also be added), the value of the third parameter $h_i$ is non-trivial.

To address the issue of determining $h_i$, we introduce some notations. Let $\bar{h}_i$ be the number of hops corresponding to the shortest path of connection i. Obviously, the number of congested hops $h_i$ satisfies $h_i \leq \bar{h}_i$, $\forall i \epsilon F_l$. Let $I = [I_1, I_2, \ldots, I_{|E|}]$ be the vector representing the congestion status of all links in the network with $I_j$ being the indicator for link j and is equal to 1 if link j is congested and 0 otherwise. Let $H = [h_1, h_2, \ldots, h_{|F|}]$ be the vector of the number of congested links in the path of every end-to-end demand, i.e., $$h_i = \sum_{j \in p(i)} I_j$$

where p(i) represents the sequence of links (path) traversed by demand i. Let $H_l = [h_{l1}, h_{l2}, \ldots, h_{|Fl|}]$ be the vector of $h_i$'s for those demands $i \epsilon F_l$.

The vectors I and H take values in the sets $\underline{I} = \{0, 1\}^{|E|}$ and $\underline{H} = \{0, 1, \ldots, \bar{h}_i\} \times \ldots \times \{0, 1, \ldots, \bar{h}_{|F|}\}$, respectively. Let g be the mapping between $\underline{I}$ and $\underline{H}$ as defined above:

$\forall I \epsilon \underline{I}$, $\forall H \epsilon \underline{H}$, H=g(I) if and only if $$h_i = \sum_{j \in p(i)} I_j,$$

i=1, 2, ..., |F| The set $\underline{I}$ is mapped under g to a subset of $\underline{H}$ denoted $\underline{H}_f$ and represents the set of feasible elements of $\underline{H}$:

$$\underline{H}_f = \{H \epsilon \underline{H} : \exists I \epsilon \underline{I} \text{ s.t. } H = g(I)\}$$

In other words, not every $H \epsilon \underline{H}$ is feasible.

Let {H} denote the set of $H_l$, l∈E. An entry for $h_i$ corresponding to demand i appears in every vector $H_l$ satisfying l∈p(i), i.e., all links in the path of connection i. If all the entries for the same demand are equal, {H} is said to be consistent. When {H} is consistent, the vector H with $h_i$ being the common entry for demand i in all $H_l$, l∈p(i), is referred to as the common vector of {H}. Finally, {H} is said to be feasible if: (i) it is consistent; and (ii) its common vector is feasible.

The computation of the link capacity in equation (5) does not take into account the multiple bottleneck effect in a network-wide scenario where a demand i may not achieve its share $r_i^l$ at link l if its share at another link along its path is smaller. Therefore, the difference between $r_i^l$ and the minimum share of demand i at all the other links in its path (which is greater than $d_i$ since $r_i^l \geq d_i$ at all links in p(i)) can be deducted from $c_l^{FIFO}$ without violating the demands, otherwise this extra capacity may be captured by other greedy demands traversing link l which already have their requirements met. In this sense, we consider $c_l^{FIFO}$ in equation (5) as an upper bound on the required link capacity and denote it by $\bar{c}_l^{FIFO}$ which we rewrite as:

$$\bar{c}_l^{FIFO}(H_l) = \max_{i \in F_l} \left\{ d_i \frac{\sum_{j \in F_l} w_j}{w_i}(H_l) \right\} \quad (6)$$

where we emphasize the dependence of the weights $w_j$, and consequently of $\bar{c}_l^{FIFO}$, on the value of $H_l$. Also, by taking into account the multiple bottleneck effect mentioned above we obtain a lower bound $\underline{c}_l^{FIFO}$ on the required link capacity as follows. Based on $\bar{c}_l^{FIFO}$, we obtain the share of demand i as:

$$r_i^l(H_l) = c_l^{FIFO}(H_l) \frac{w_i}{\sum_{j \in F_l} w_j}(H_l)$$

and then compute the minimum share along the path:

$$r_i(\{H\}) = \min \{r_i^{l*}(H_{l*}), l^* \epsilon p(i); \hat{r}\} \quad (7)$$

where the value of $\hat{r}_i \geq d_i$ could be set to some value that represents any potential limitation due for instance to the speed of the VPN's access link to the network. When the minimum in equation (7) corresponds to $r_i^{l*}(H_{l*})$, we say that demand i is bottlenecked by link l*, or that link l* is the bottleneck link for demand i. Finally, $\underline{c}_l^{FIFO}$ is obtained as:

$$\underline{c}_l^{FIFO}(\{H\}) = \sum_{i \in F_l} r_i(\{H\}) \quad (8)$$

which is now a function of not only $H_l$ but $H_l$ for all $l^* \epsilon p(i)$, which is a subset of $\{H\}$. The reason $\underline{c}_l^{FIFO}$ is a lower bound is that for any given feasible $\{H\}$, there may exist some demand idling scenarios that result in shifting the bottleneck of some demands which will then require a capacity larger than $\underline{c}_l^{FIFO}$ to meet the requirements of the active demands.

So far we have discussed the upper and lower bound capacities $\overline{c}_l^{FIFO}$ and $\underline{c}_l^{FIFO}$ as a function of $H_l$ for each link l in the network. Since it is not known what the real $H_l$ is, the following bounds are determined:

$$\overline{c}_l^{FIFO}(H^{max}) = \max_{H \in H_f} \overline{c}_l^{FIFO}(H_l) \quad (9)$$

$$\underline{c}_l^{FIFO}(H^{min}) = \min_{H \in \underline{H}_f} \underline{c}_l^{FIFO}(\{H\}) \quad (10)$$

where for each feasible $H \epsilon H_f$, we form the corresponding $H_l$'s and compute $\overline{c}_l^{FIFO}(H_l)$ and $\underline{c}_l^{FIFO}(\{H\})$. The exact value of required capacity $c_l^{FIFO}$ satisfies $\underline{c}_l^{FIFO}(H^{min}) \leq c_l^{FIFO} \leq \overline{c}_l^{FIFO}(H^{max})$. Advantageously, these bounds provide us with upper and lower bounds on link capacities independent of the actual value of $H \epsilon \underline{H}_f$. Although these bounds are computable, a more practical, i.e., easier to compute, set of bounds is given as:

$$\overline{c}_l^{FIFO}(H^{worst}) = \max_{H \in \underline{H}} \overline{c}_l^{FIFO}(H_l) \quad (11)$$

$$\overline{c}_l^{FIFO}(H^{best}) = \max_{H \in \underline{H}} \overline{c}_l^{FIFO}(H_l) \quad (12)$$

where the maximum and minimum are taken over all values of H regardless of feasibility. It is evident that $H_l^{worst}$, is obtained by choosing $H_l$ for each i in equation (6) with $h_i = \overline{h}_i$ and $h_j = 1$ for $j \neq i$ (each demand $i \epsilon F_l$ has at least link l as a congested link in its path). Similarly, $H_l^{best}$ is obtained by taking $H_l$ for each i in equation (6) with $h_i = 1$ and $h_j = \overline{h}_j$ and for $j \neq i$.

However, by definition, it is to be noted that the following inequalities exist:

$$\overline{c}_l^{FIFO}(H^{best}) \leq \overline{c}_l^{FIFO}(H^{min}) \leq \overline{c}_l^{FIFO}(H_l) \leq \overline{c}_l^{FIFO}(H^{max}) \leq \overline{c}_l^{FIFO}(H^{worst});$$
and $$\underline{c}_l^{FIFO}(H^{min}) \leq \overline{c}_l^{FIFO}(H^{min})$$

where $\overline{c}_l^{FIFO}(H^{min})$ is defined as in equation (9) by taking minimum instead of maximum. Therefore, $\overline{c}_l^{FIFO}(H^{worst})$ is used as an upper bound. $\overline{c}_l^{FIFO}(H^{best})$ is a good candidate for a lower bound since $\overline{c}_l^{FIFO}(H^{best})$ and $c_l^{FIFO}(H^{min})$ are both less than $\overline{c}_l^{FIFO}(H^{min})$ and in the case studies presented in Section 5.0, it is shown that $\overline{c}_l^{FIFO}(H^{best}) \leq c_l^{FIFO}(\{H\})$ for two typical values of $\{H\}$ corresponding to H equal to $H^{hop}$ and $H^{one}$ where $h_i = \overline{h}_i$ and $h_i = 1$, $i = 1, 2, \ldots, |F|$, respectively. $H^{one}$ corresponds to the case where each demand has one single congested link on its path, which may not be feasible. $H^{hop}$ is feasible and corresponds to the case where all demands are active and greedy and each link carries at least one one-hop demand. Embodiments of these methodologies will be explained below in Section 1.4.

1.2 Weighted Fair Queuing with Longest Queue Drop (WFQ/LQD)

Next, the following discussion assumes that the designer using the system 10 of the invention has selected WFQ/LQD as the scheduling/buffering scheme. It is known that PacketStar's IP Switch supports 64000 flow queues per output link with a three-level hierarchical WFQ scheduler, e.g., V. P. Kumar, T. V. Lakshman, and D. Stiliadis, "Beyond Best Effort: Router Architectures for the Differentiated Services of Tomorrow's Internet," IEEE Comm. Magazine, Vol. 36, No. 5, pp. 152–164 (May 1998). At the highest level of the scheduler's hierarchy, the link capacity is partitioned among different VPNs, within each VPN it can be partitioned based on application classes (e.g., Ftp-like TCP flows, Telnet-like TCP flows, UDP flows, etc.), and finally the bandwidth of each application class can be further partitioned among the flows belonging to that class (typically equal weight at the flow level within each class, but could be made different).

In order to efficiently use the buffer resources, PacketStar IP Switch uses soft partitioning of a shared buffer pool among all flows. A flow can achieve its weight's worth of link capacity (i.e., get a link share proportional to its weight) if it can maintain an adequate backlog of packets in the shared buffer. In other words, the WFQ scheduler provides fair opportunities for each flow to access the link for packet transmission but this may not translate into a fair share of the link capacity if the flow is unable to sustain an appropriate backlog of packets due to inadequate control of access to the shared buffer. This problem could take place for instance when loss-sensitive traffic like TCP is competing with non-loss-sensitive traffic such as uncontrolled UDP, or when TCP connections with different round trip delays (RTD) are competing for the link capacity. In the first scenario, since TCP throughput is sensitive to packet loss (TCP sources reduce their rate by shrinking their window when packet loss is detected), applications that do not adapt their rate according to loss conditions (either non-adaptive UDP sources or aggressive TCP sources that do not comply with standard TCP behavior) are able to capture an unfair share of the common buffer pool. The second scenario of TCP connections with different RTD is a well known problem, e.g., S. Floyd and V. Jacobson, "On Traffic Phase Effects in Packet-Switched Gateways," Internetworking: Research and Experience, Vol. 3, No. 3, pp. 115–156 (September 1992); T. V. Lakshman and U. Madhow, "Performance Analysis of Window-Based Flow Control using TCP/IP: The Effect of High Bandwidth-Delay Products and Random Loss," IFIP Trans. High Perf. Networking, North Holland, pp. 135–150 (1994). The reason behind the unfairness to TCP connections with large RTD is that TCP's constant window increase per RTD during congestion avoidance phase allows connections with smaller RTD to increase their window faster, and when they build a backlog at some router in their path, this backlog grows faster for connections with smaller RTD since it grows by one packet every RTD.

To solve these problems resulting from complete buffer sharing, PacketStar IP Switch uses the following buffer management strategy: each flow is allocated a nominal buffer space which is always guaranteed and the flow's buffer occupancy is allowed to exceed this nominal allocation when buffer space is available. This nominal allocation is ideally set proportional to the connection's bandwidth delay product but in the absence of delay information could be set proportional to the connection's weight in the WFQ scheduler. When an arriving packet cannot be accommodated in the buffer, some packet already in the buffer is pushed out. The flow queue from which a packet gets discarded is the one with the largest excess beyond its nominal allocation (if the nominal allocations are equal, this is equivalent to dropping from the longest queue). Since, as explained above, TCP flows with short RTD are likely to have the longest queues above their nominal allocation, the LQD policy alleviates unfairness to large RTD connections. In addition, non-adaptive sources are likely to have long queues and will be penalized by the LQD policy.

Thus, the flow isolation provided by WFQ, combined with the protection and fairness provided by LQD, allow each flow, class of flows, or a VPN's end-to-end demand to obtain a share of the link capacity proportional to its assigned weight, e.g., see B. Suter, T. V. Lakshman, D. Stiliadis, and A. K. Choudhury, "Design Considerations for Supporting TCP with Per-flow Queuing," Proc. IEEE Infocom, pp. 299–306, San Francisco (March 1998).

As a result, the scheduler weights and the nominal buffer allocations are set at a given link l in such a way that the link capacity needed to meet a set of point-to-point VPN demands $d_i$ is simply equal to the sum of the demands, i.e., $$c_l^{WFQ} = \sum_{i \in F_l} d_i \quad (13)$$

where $F_l$ is the set of all VPN demands that are routed through link l (i.e. they have link l in their shortest path). However, as compared to a router with WFQ/LQD capabilities, a larger capacity is needed to meet the same demands when the router can only support FIFO/RED.

1.3 Capacity Requirements Due to Both TCP and UDP

So far, only TCP traffic has been accounted for in computing the link capacity requirements as given by the bounds in equations (11) and (12) for the FIFO/RED case and in equation (13) for the WFQ/LQD case. Because of the isolation provided by per-flow queuing, we only need to add the UDP demand to obtain the total capacity requirements for the WFQ/LQD case. We apply the same for the FIFO/RED case assuming that the aggregate UDP traffic is not likely to exceed its demand. Therefore, the link capacity requirement for the WFQ/LQD case is given by:

$$C_l^{WFQ} = \left\lceil c_l^{WFQ} + \sum_{i \in F_l} d_i^{UDP} \right\rceil \quad (14)$$

and for the FIFO/RED case, the upper bound is:

$$\overline{C}_l^{FIFO}(H^{worst}) = \left\lceil \overline{c}_l^{FIFO}(H^{worst}) + \sum_{i \in F_l} d_i^{UDP} \right\rceil \quad (15)$$

the lower bound is:

$$\underline{C}_l^{FIFO}(H^{best}) = \left\lceil \underline{c}_l^{FIFO}(H^{best}) + \sum_{i \in F_l} d_i^{UDP} \right\rceil. \quad (16)$$

Furthermore, under the special cases of $H^{hop}$ and $H^{one}$ the upper and lower bounds are given by:

$$\overline{C}_l^{FIFO}(H^{hop}) = \left\lceil \overline{c}_l^{FIFO}(H^{hop}) + \sum_{i \in F_l} d_i^{UDP} \right\rceil \quad (17)$$

$$\underline{C}_l^{FIFO}(H^{hop}) = \left\lceil \underline{c}_l^{FIFO}(H^{hop}) + \sum_{i \in F_l} d_i^{UDP} \right\rceil \quad (18)$$

$$\overline{C}_l^{FIFO}(H^{one}) = \left\lceil \overline{c}_l^{FIFO}(H^{one}) + \sum_{i \in F_l} d_i^{UDP} \right\rceil \quad (19)$$

$$\underline{C}_l^{FIFO}(H^{one}) = \left\lceil \underline{c}_l^{FIFO}(H^{one}) + \sum_{i \in F_l} d_i^{UDP} \right\rceil \quad (20)$$

where $d_i^{UDP}$ denotes the UDP throughput requirement for demand i and the ceiling function [.] is introduced to account for the fact that link capacity is discrete (in units of trunk capacity).

1.4 Link Capacity Computation Embodiments

Given the above-derived equations, the following are various embodiments of methodologies of the invention for calculating link capacity requirements relevant to the particular design criteria selected by the user of the network design system of the invention. As will be indicated, the methodologies are performed by the worst-case link capacity design requirements processor 14 and/or the optimistic link capacity design processor 16 (FIG. 1).

Figure 3:
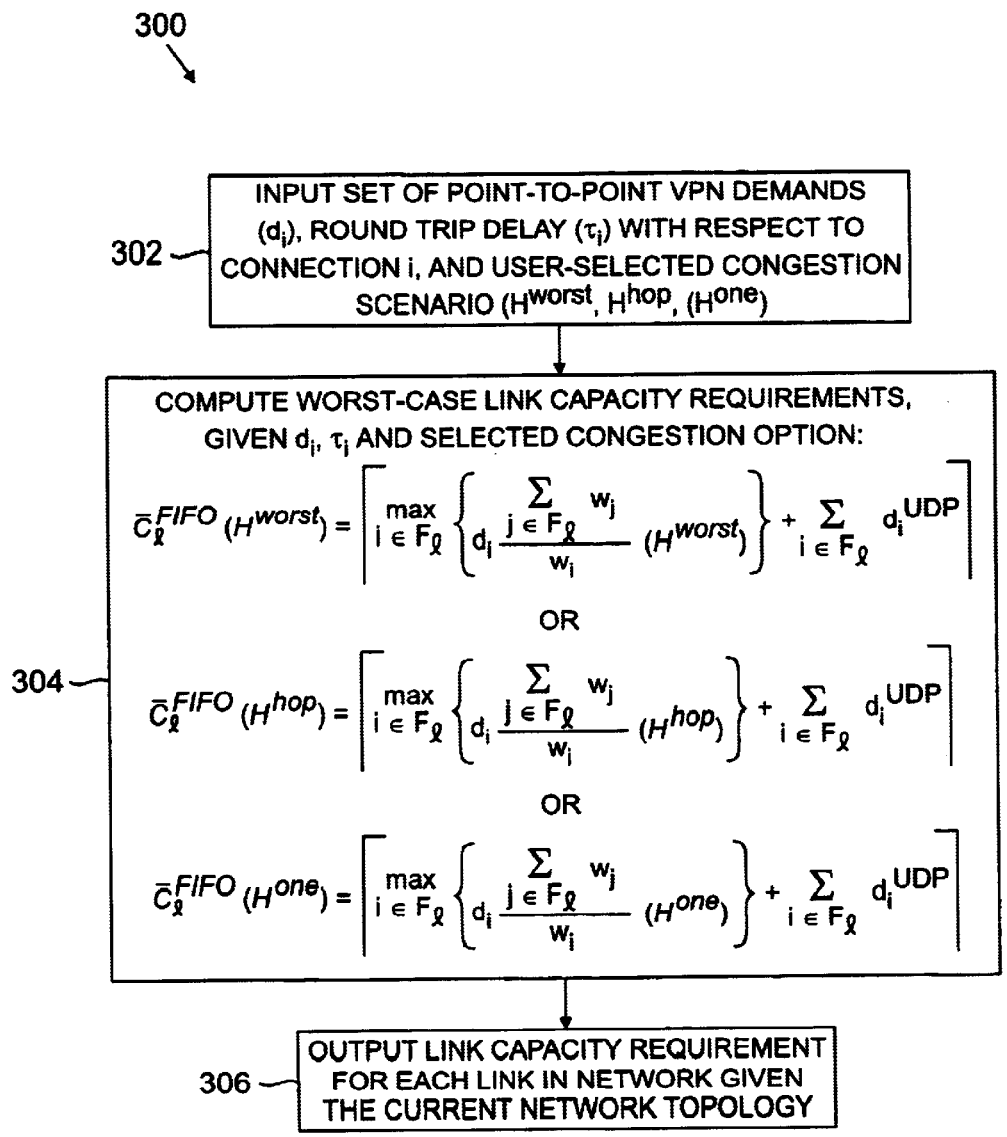
FIG. 3 is a flow chart of a method of computing link capacity requirements according to an embodiment of the present invention.

Referring to FIG. 3, a method 300 of computing FIFO/RED-based worst-case link capacity requirements according to the invention is shown. It is to be understood that the notation c denotes the link capacity taking into account only the TCP traffic, while C denotes the link capacity taking into account both TCP and UDP traffic. Accordingly, as is evident from the terms in the equations, the first addition term is the link capacity requirement for TDP traffic and the second addition term is the link capacity requirement for UDP traffic. Further, it is to be appreciated that such computation is performed by the worst-case link capacity requirements processor 14 (FIG. 1) based on input from the routing processor 12 and the user. Accordingly, such design methodology provides the user of the system 10 with a computation, based on particular input specifications, of link capacity requirements on a link by link basis.

First, in step 302, the processor 14 receives input parameters from routing processor 12 and the user. The inputs from processor 12 include the set of point-to-point VPN demands, $d_i$, the round trip delay, $\tau_i$, associated with connection i. Of course, these inputs are initially specified by the user. In addition, the user specifies the scheduling/buffering scheme, which in this case is FIFO/RED, and the congestion option $H^O$ (e.g., $H^{worst}$, $H^{hop}$, and $H^{one}$). It is to be understood, as previously explained, that the congestion option is an assignment of some $h_i$ value for the given design criteria. As explained, $h_i$ refers to the number of congested links in the path of connection i. Referring back to section 1.2, $H^{worst}$ is obtained by choosing $H_l$ for each i in equation (6) with $h_i = \overline{h}_i$ and $h_j = 1$ for $j \neq i$ (each demand $i \in F_l$ has at least link l as a congested link in its path). Recall that $H^{worst}$ is the upper bound defined in equation (15) and, along with the lower bound $H^{best}$ (computed by the optimistic link capacity processor 16) apply to all values of H. Further, $H^{hop}$ and $H^{one}$ as defined in step 303, which are special cases of the upper bound $H^{worst}$ correspond to $h_i=\bar{h}_i$ and $h_j=1$, i=1, 2, ..., |F|, respectively. $H^{one}$ corresponds to the case where each demand has one single congested link on its path, which may not be feasible. $H^{hop}$ is feasible and corresponds to the case where all demands are active and greedy and each link carries at least one one-hop demand. It is to be understood that in accordance with the invention, the user need only specify the option $H_O$ since the values of $h_i$ corresponding thereto are preferably stored in the memory associated with processor 14.

Next, in step 304, depending on the option chosen by the user, the worst-case link capacity requirements are computed. That is, the link capacity for each link in the current network topology is computed based on the demands, the delay, the scheduling/buffering scheme and congestion option selected. It should be noted that the equations for $H^{worst}$, $H^{hop}$, $H^{one}$ shown in step 304 of FIG. 3 are, respectively, the same as the equations (15), (17) and (19) above, with the right side of equation (6) inserted as the first term in the ceiling function. Lastly, the link capacity requirements (denoted as reference designation B in FIG. 1) for each link of the current topology are output to the user via, for example, a display associated with the processor 14.

Figure 4:
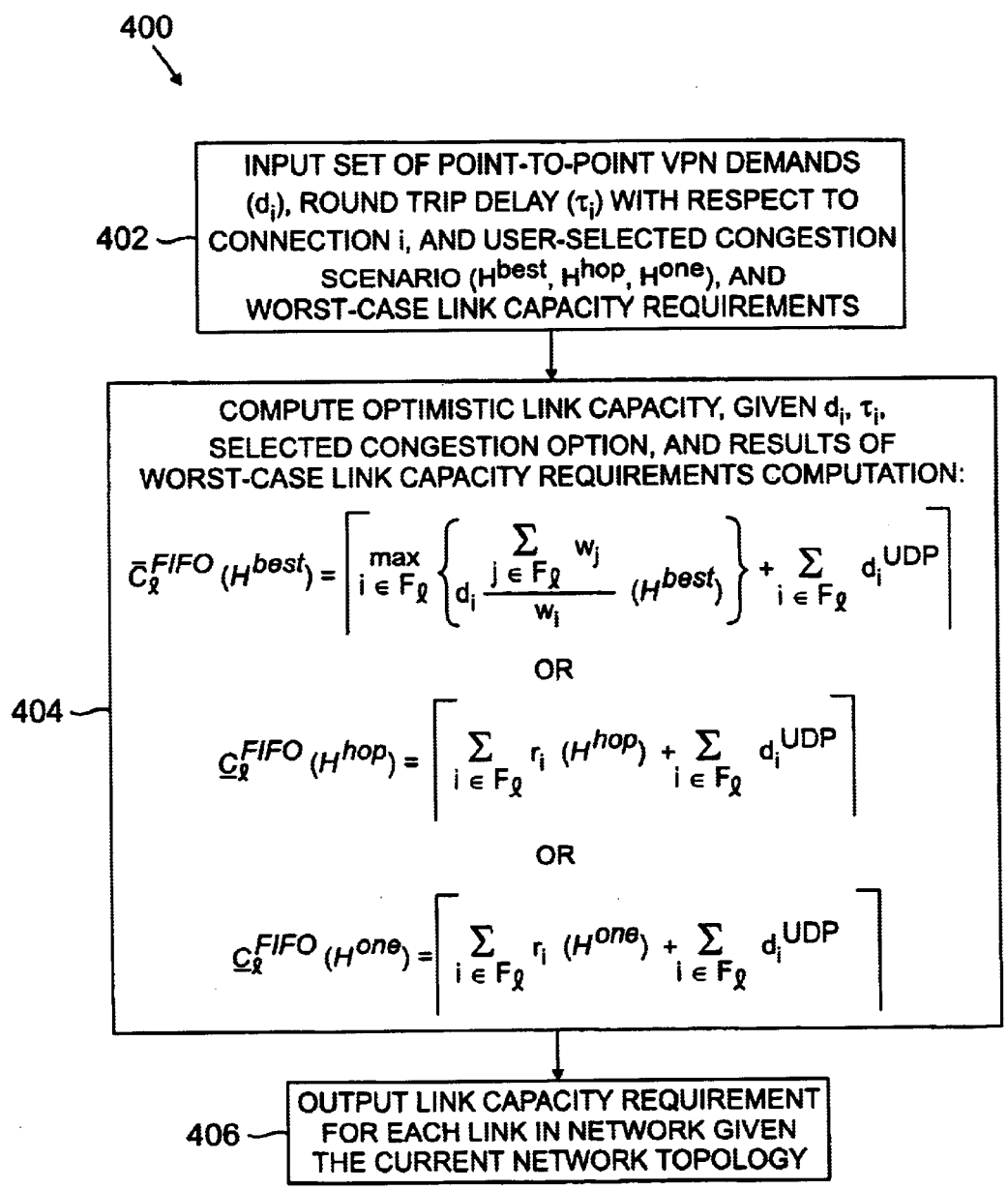
FIG. 4 is a flow chart of a method of computing link capacity requirements according to another embodiment of the present invention.

Referring now to FIG. 4, a method 400 of computing FIFO/RED-based optimistic link capacity according to the invention is shown. Again, as is evident from the terms in the equations, the first addition term is the link capacity requirement for TDP traffic and the second addition term is the link capacity requirement for UDP traffic. Further, it is to be appreciated that such computation is performed by the optimistic link capacity design processor 14 (FIG. 1) based on input from the routing processor 12, the user and the worst-case link capacity requirements processor 14 (i.e., since, the share $r_i$ is a function of $\bar{c}_l^{FIFO}$). Accordingly, such design methodology permits the user of the system 10 to compute, based on particular input specifications, link capacity requirements on a link by link basis.

First, in step 402, the processor 16 receives similar input as processor 14, that is, the network topology, the source-destination demands, round trip delay and the congestion scenario selection made by the user. Also, the link capacity requirements computed by the processor 14 are provided to processor 16. Again, it is to be understood that in accordance with the invention, the user need only specify the option $H^O$ (e.g., $H^{worst}$, $H^{hop}$, $H^{one}$), since the values of $h_i$ corresponding thereto are preferably stored in the memory associated with processor 16. As previously mentioned, $H^{best}$ is obtained by taking $H_I$ for each i in equation (6) with $h_i=1$ and $h_j=\bar{h}_j$ and for $j \neq i$. Further, $H^{hop}$ and $H^{one}$ as defined in step 404 correspond to $h_i=\bar{h}_i$ and $h_i=1$, i=1, 2, ..., |F|, respectively.

Next, depending on the option chosen by the user, the optimistic link capacity requirements are computed. That is, the link capacity for each link in the current network topology is computed based on the demands, the delay, the scheduling/buffering scheme and congestion option selected. It should be noted that the equations for $H^{worst}$, $H^{hop}$, $H^{one}$ shown in step 404 of FIG. 4 are, respectively, the same as the equations (16), (18), and (20) above, with the right side of equation (6) inserted as the first term in the ceiling function of equation (16) and the night side of equation (8) inserted as the first term in the ceiling function of equations (18) and (20). Lastly, the link capacity requirements (denoted as reference designation D in FIG. 1) for each link of the current topology are output to the user via, for example, a display. It is to be understood that one input device and one output device may be used for all user-selectable inputs and outputs associated with the system 10 of the invention. Accordingly, the following point may be noted regarding the output of processor 16 as compared with the output of processor 14: the network topology remains unchanged, however, the link capacity of some of the links may be reduced due to consideration of the network-wide multiple bottleneck effect.

Figure 5:
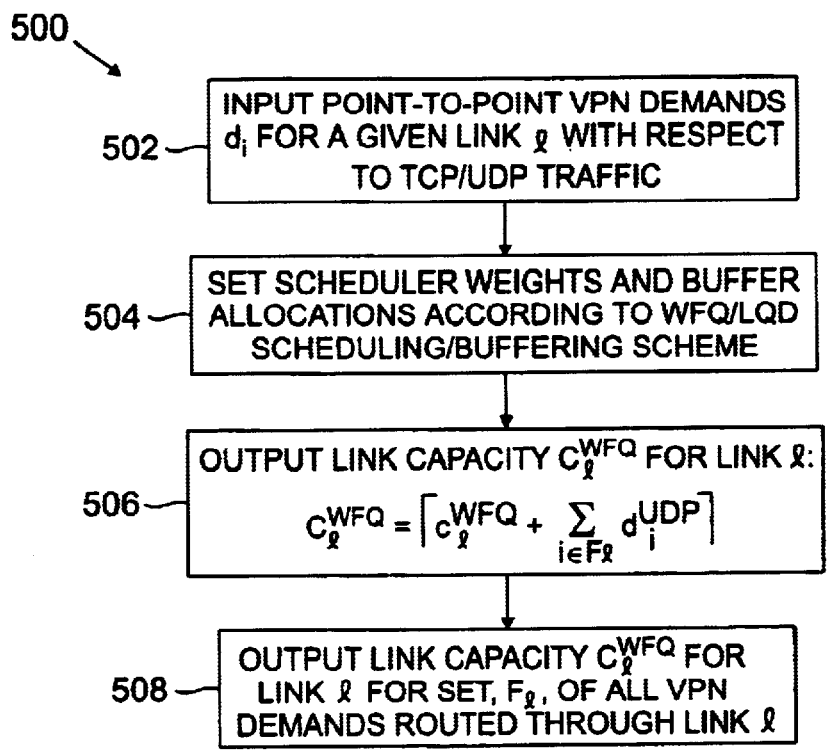
FIG. 5 is a flow chart of a method of computing link capacity requirements according to yet another embodiment of the present invention.
Figure 6A:
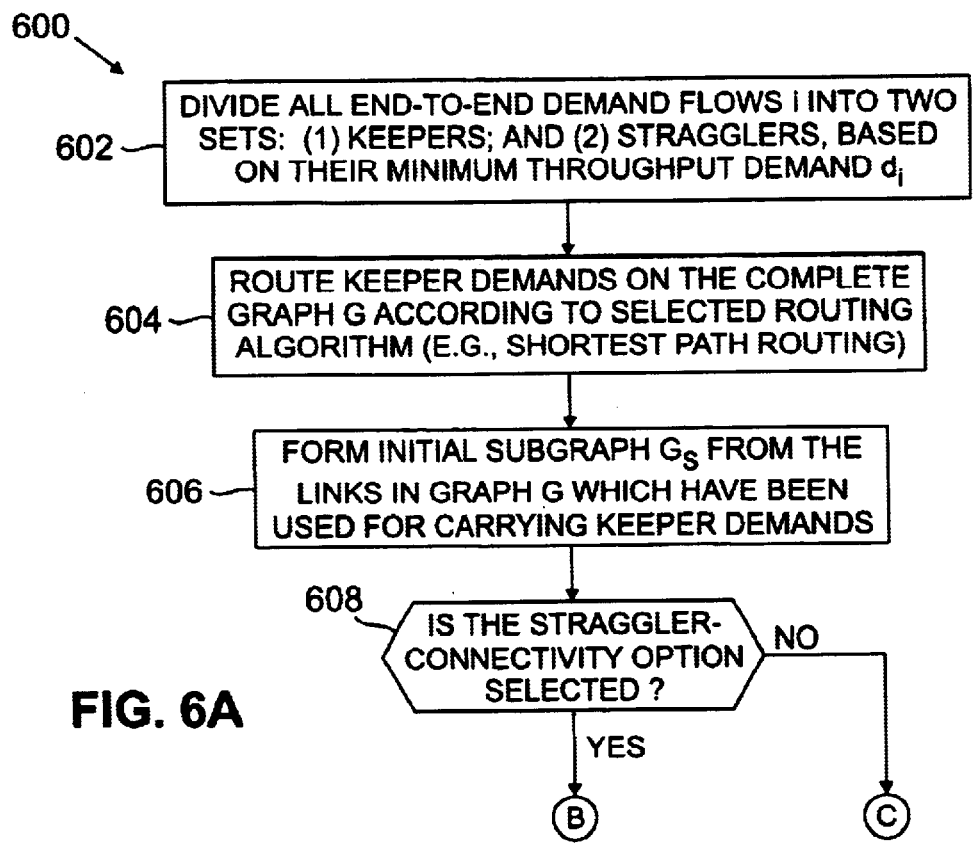
FIGS. 6A through 6D are a flow chart of a method of optimizing a network topology according to an embodiment of the present invention.
Figure 6B:
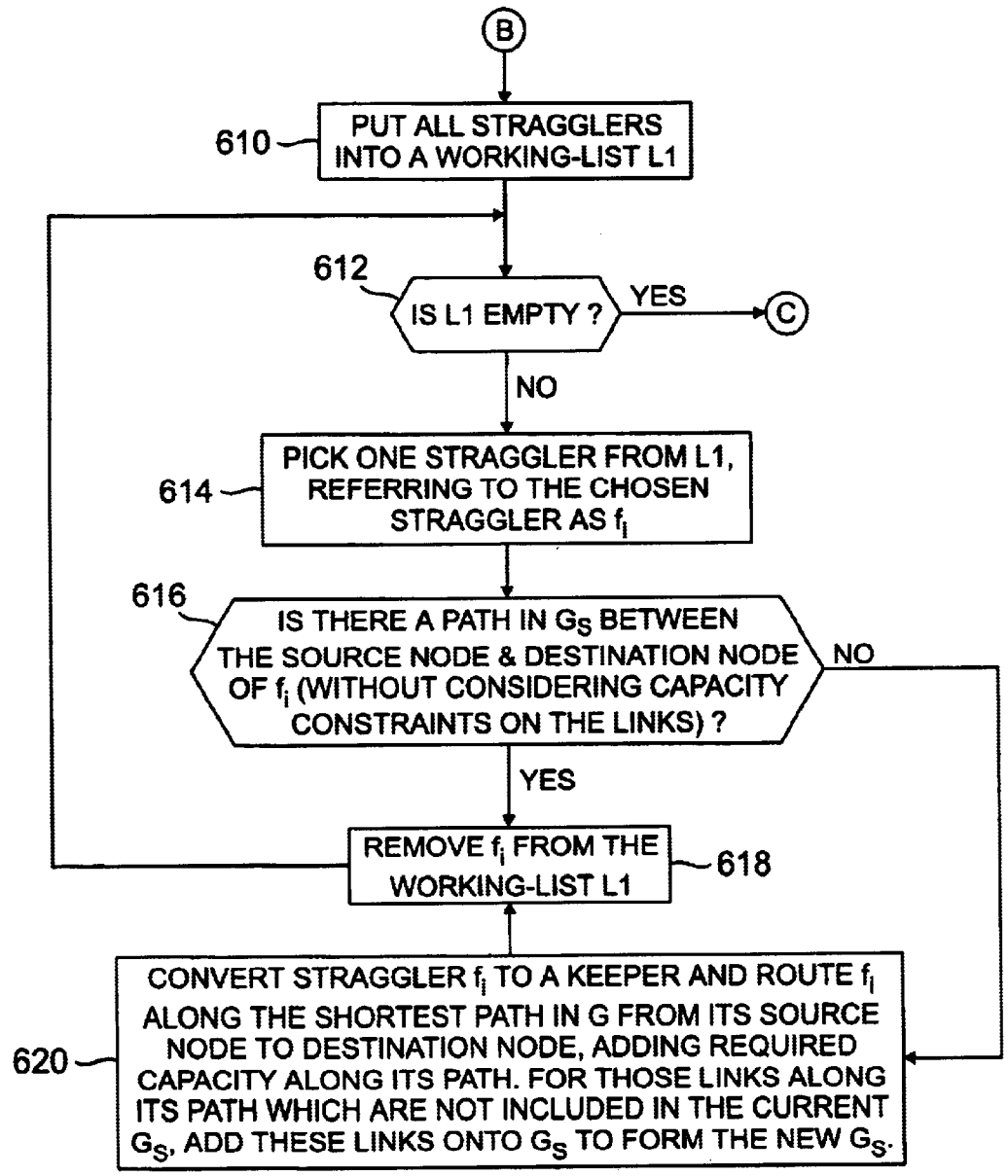
Figure 6C:
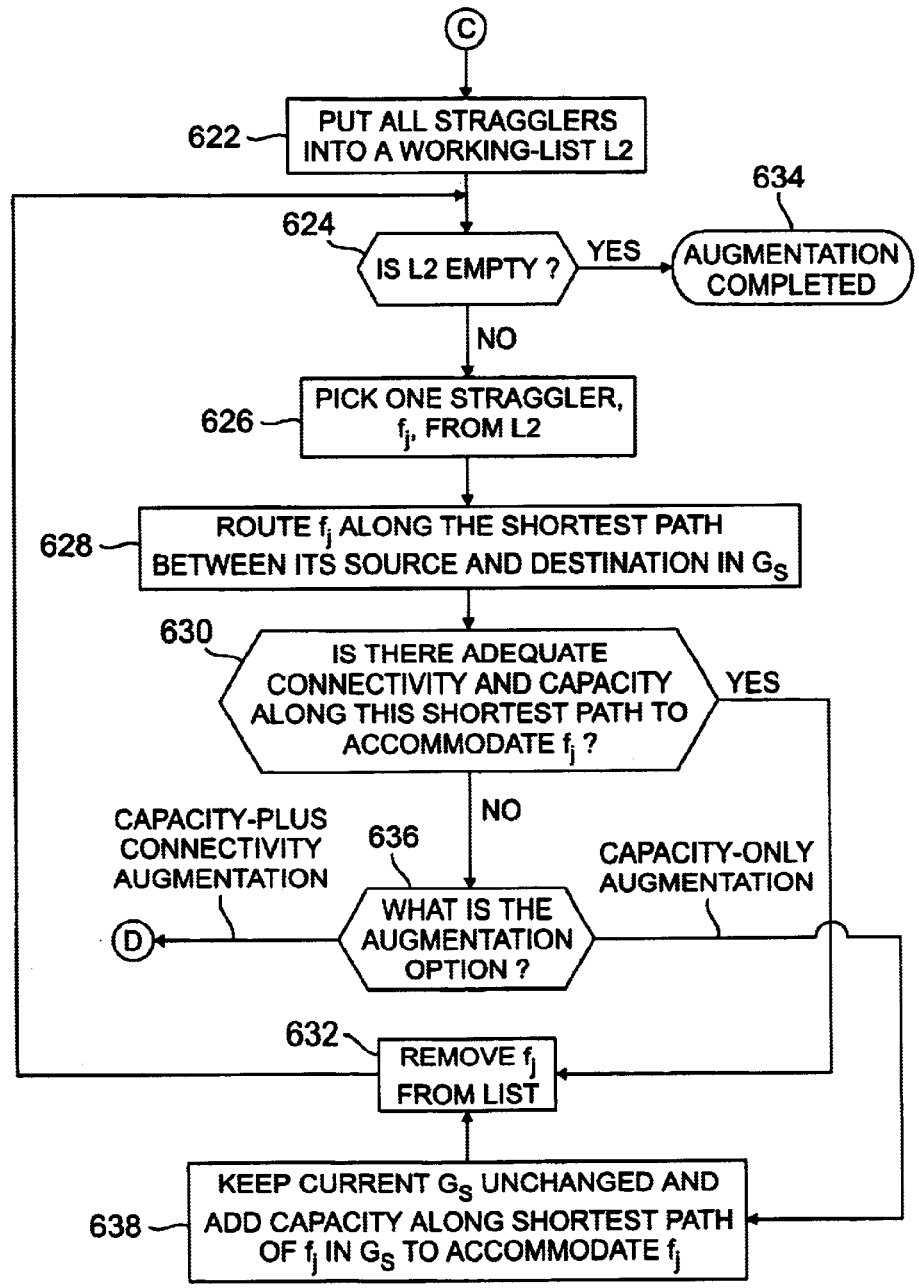
Figure 6D:
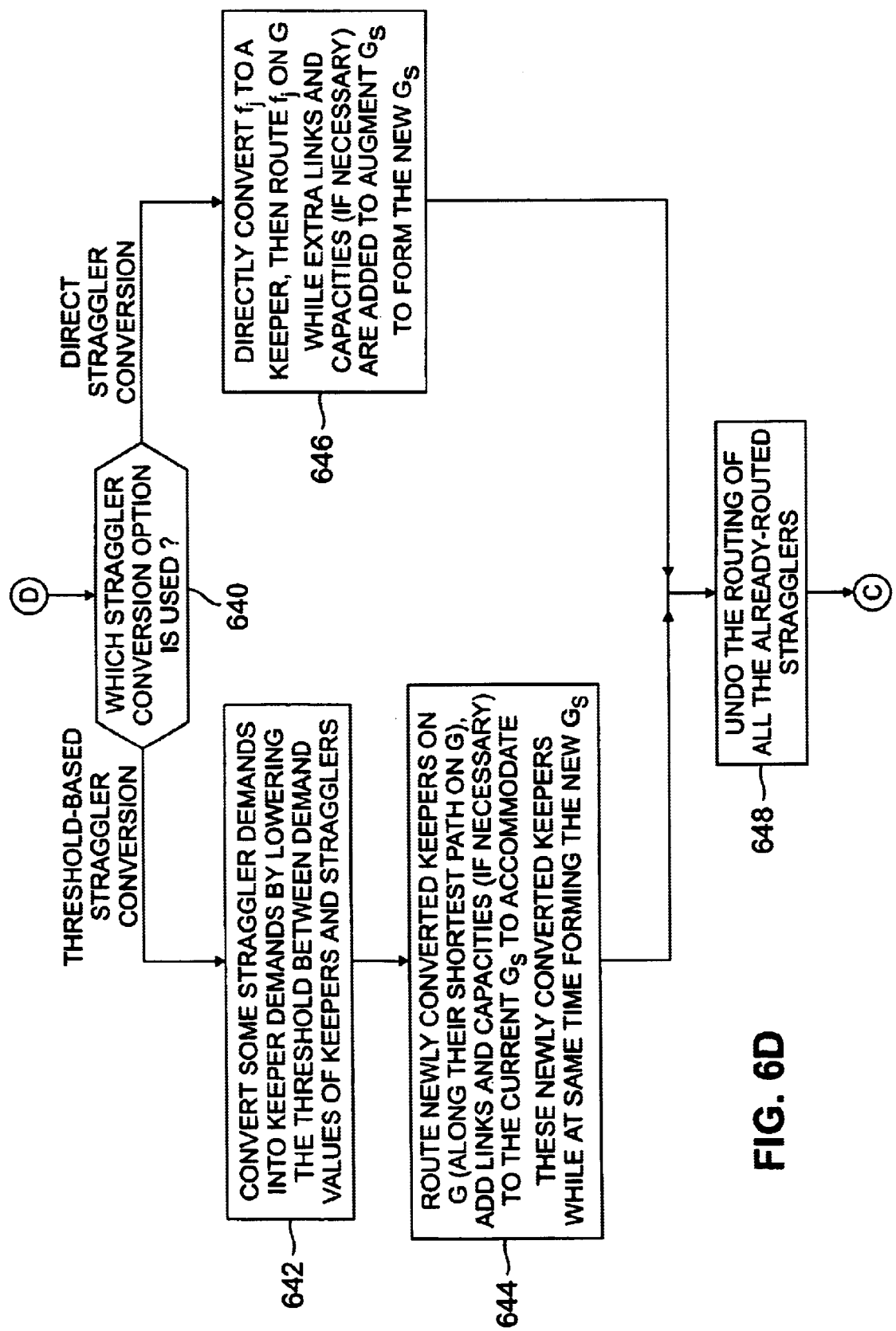

Referring now to FIG. 5, a method 500 of computing WFQ/LQD-based link capacity $c_l^{WFQ}$ according to the invention is shown. This embodiment assumes that the user has selected the WFQ/LQD scheduling/buffering scheme for his design. As such, it is to be appreciated that computations based on bounds and congestion options are not necessary and, as result, only the VPN demands $d_i$ for each link l with respect to TCP/UDP traffic is required as input, in step 502, to compute link capacity requirements. It is also to be appreciated that since upper and lower bounds need not be computed in the WFQ/LQD scheme, either processor 14 or processor 16 may be used to compute such link capacity requirements. Thus, in step 504, the scheduler weights and the nominal buffer allocations are set at a given link l in such a way that the link capacity needed to meet a set of point-to-point. VPN demands $d_i$ is simply equal to the sum of the demands, as per the equation shown in step 506 (which is the same as equation (14)), where $F_l$ is the set of all VPN demands that are routed through link l (i.e. they have link l in their shortest path). In step 508, the link capacity is output to the user (e.g., via a display).

2.0 Network Topology Optimization

Recall that for the capacity assignment problem under consideration, we have the flexibility to eliminate some of the links in the original network topology G by making zero capacity assignments. The motivation of link removals is to get rid of some poorly utilized network facilities to reduce overall network cost. Throughout the overall design process of the invention, the network cost is computed based on the following function:

$$J = \sum_{l=1}^{|E|} \{M(C_l, L_l) + T(C_l)\} \quad (21)$$

where $M(.,.)$ and $T(.)$ are the mileage and termination cost functions, respectively. It is to be appreciated that this cost function is selected for its simplicity and ease of illustration. Other more general forms of cost functions can be readily incorporated with the present invention. It is to be appreciated that the network topology optimization processor 18 preferably computes the network cost. However, processors 14 or 16 could do the same.

In the following subsections, we will consider two embodiments and their variants for network topology optimization. They are the link augmentation approach and the link deloading approach. The process of network topology optimization is also performed by the network topology optimization processor 18. Also, the network topology provided initially to the routing processor 12 for use by the system 10 may be provided by the network topology optimization processor 18 or, alternatively, by the user of system 10.

2.1 Augmentation Optimization

Referring to FIGS. 6A through 6D, a method 600 of optimizing the network topology employing the augmentation approach according to the invention is shown. In the augmentation approach, we start with a proper subgraph $G_s$ of G and augment it with additional links and/or capacities until all the demands can be routed. Initially, a subset of the edges in G is selected to form $G_s$. The way to form $G_s$ is as follows: First, in step 602, all the end-to-end demand flows i are divided into two sets, namely, the keepers and the stragglers, based on their minimum throughput demand $d_i$. In one embodiment, the criteria is to make demands which require at least one unit of trunk bandwidth as keepers while the rest, i.e. those with fractional trunk size demands, are made stragglers. In step 604, the keeper demands are then routed on the complete graph G according to the routing algorithm of choice such as, for example, shortest path routing which is the algorithm used by the OSPF routing protocol. Once the route is computed for a keeper, necessary capacities along the route are provided in the units of trunk size to accommodate the keeper demand. Due to the discrete nature of the trunk size, it is likely to have spare capacities along the keeper routes. After routing all the keeper demands, the links in G which have been used for carrying keeper demands forms the initial subgraph $G_s$ (step 606). Note that $G_s$ may not provide the connectivity between the source and destination nodes of some of the stragglers. Thus, the present invention provides a designer with a straggler-connectivity augmentation option, in step 608, to provide connectivity between all source-destination node pairs. If the option is selected, all stragglers are placed into a working-list L1, in step 610. If the list is not empty (step 612), one straggler is picked from L1, in step 614. The chosen straggler is referred to as $f_i$. Next, in step 616, it is determined if there is a path in $G_s$ between the source node and destination node of $f_i$, without considering capacity constraints on the links. If there is such path, then $f_i$ is removed from the working-list L1, in step 618. If not, then in step 620, straggler $f_i$ is converted to a keeper and then routed along the shortest path in G from its source node to its destination node, adding required capacity along its path. For those links along its path which are not included in the current $G_s$, these links are added onto $G_s$ to form the new $G_s$. Then, $f_i$ is removed from the working-list L1, in step 618.

After $f_i$ is removed from L1, the list is checked to see if any other stragglers are left (step 612). If there are, then steps 614 through 620 are repeated. If not, the processor proceeds to step 622. Recall that in step 608, the option to select straggler connectivity is given to the user of the design system 10. If the straggler connectivity option is not selected or the straggler connectivity option was selected and completed, the following procedure is performed. All stragglers are placed into a working-list L2, in step 622. As the process progresses, the working-list L2 is iteratively checked to see if there are any more stragglers left (step 624). In step 626, one straggler, $f_j$, is picked from L2 (step 626). In step 628, $f_j$ is routed along the shortest path between its source and destination nodes in $G_s$. Then, in step 630, the method includes determining whether there is adequate connectivity and capacity along this shortest path to accommodate $f_j$. If yes, $f_j$ is removed from the list L2 (step 632) and the list is checked to see if there are any remaining stragglers in the list (step 624) so that the process can be repeated. However, if there is not adequate connectivity and capacity to accommodate $f_j$ along this shortest path, then the designer may choose between two alternative augmentation methods, in step 636. One method is referred to as the capacity-only augmentation approach and the other is referred to as the capacity-plus connectivity augmentation approach.

In capacity-only augmentation, the approach is to keep the initial $G_s$ unchanged from now on. If a straggler cannot be accommodated in $G_s$, additional capacities are added along its route (step 638). One advantage of this approach is computational efficiency because $G_s$ remains unchanged after the initial phase. As such, the routes of the stragglers are not influenced by subsequent capacity augmentations to $G_s$. Note that this is not the case for other approaches where connectivity augmentation can take place after part of the stragglers have been routed. After step 638, $f_j$ is removed from the list (step 632) and the process repeated for remaining stragglers in L2.

An alternative augmentation strategy of the invention provides that when a straggler cannot be routed on $G_s$ due to the lack of spare capacity or connectivity in $G_s$ (the latter case should not happen if the optional connectivity completion procedure (steps 610 through 620) has been performed for $G_s$), additional stragglers are converted to keepers to enrich both the spare capacities and connectivity of $G_s$. The straggler-to-keeper conversion can be accomplished via one of the following two approaches. The designer may choose the method, in step 640.

A first approach is referred to as threshold-controlled straggler conversion. The approach is to convert some straggler demands to keeper demands by lowering the threshold between the demand values of keepers and stragglers (step 642). This threshold is initially set to the unit trunk size. The newly converted keepers are then routed, in step 644, on their shortest path in the full topology G. Links are added with necessary capacities assigned. Any newly activated link is then used to augment the current $G_s$ and form a new $G_s$. Note that although capacity and connectivity may be added when the threshold is lowered, these newly added resources may not directly address the need of the straggler targeted to be routed. Also, since there may be change of connectivity in $G_s$, the shortest paths of previously routed stragglers may be altered in the new $G_s$ (but not the keepers since they are routed on G). As a result, it is desirable to undo the routing of all the already-routed stragglers (step 648) and then return to step 622 to re-route the stragglers. This threshold lowering, straggler-to-keeper conversion, and $G_s$ augmentation process is repeated (step 624) until all the stragglers can be routed on $G_s$. The resultant $G_s$ then becomes the final network topology. It is evident why the connectivity completion option (step 608) is performed to form the initial $G_s$, i.e., without this option, if there is a small straggler demand which does not have connectivity in $G_s$, the threshold may continue to be lowered until this small straggler demand is converted to a keeper. This can be quite wasteful from the perspective of capacity build-up, as well as computational inefficiency. The former refers to the introduction of unnecessary spare capacities in the wrong locations of the network and the latter refers to the fact that the stragglers are re-routed many times, i.e., whenever the threshold is lowered and the connectivity of $G_s$ changes.

An alternative straggler conversion approach is referred to as direct straggler conversion wherein a straggler is directly converted to a keeper when it cannot be routed on the current $G_s$ (step 646). Again, the converted straggler is then routed on G while extra links (if necessary) and capacities are added to augment $G_s$. Due to possible changes in shortest paths after the augmentation of $G_s$, all previously routed stragglers have to be undone, in step 648, and then re-routed (step 622), as in the case of threshold-controlled conversion.

Then, regardless of the conversion option selected, once all stragglers are re-routed and no more stragglers are present in working-list L2, the network optimization process is complete (block 634) thus yielding the final network topology.

2.2 Link Deloading Optimization

Figure 7:
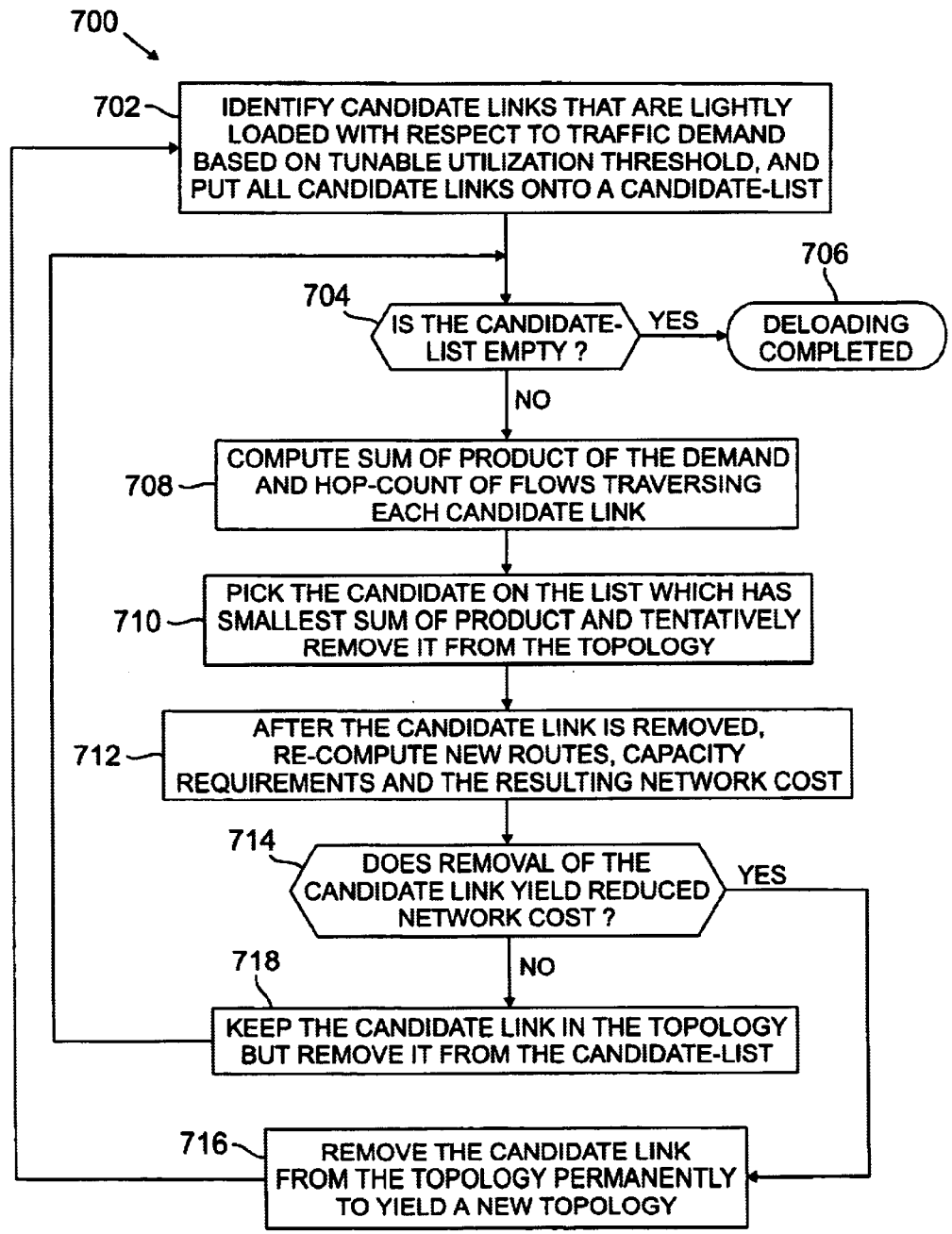
FIG. 7 is a flow chart of a method of optimizing a network topology according to another embodiment of the present invention.
Figure 8:
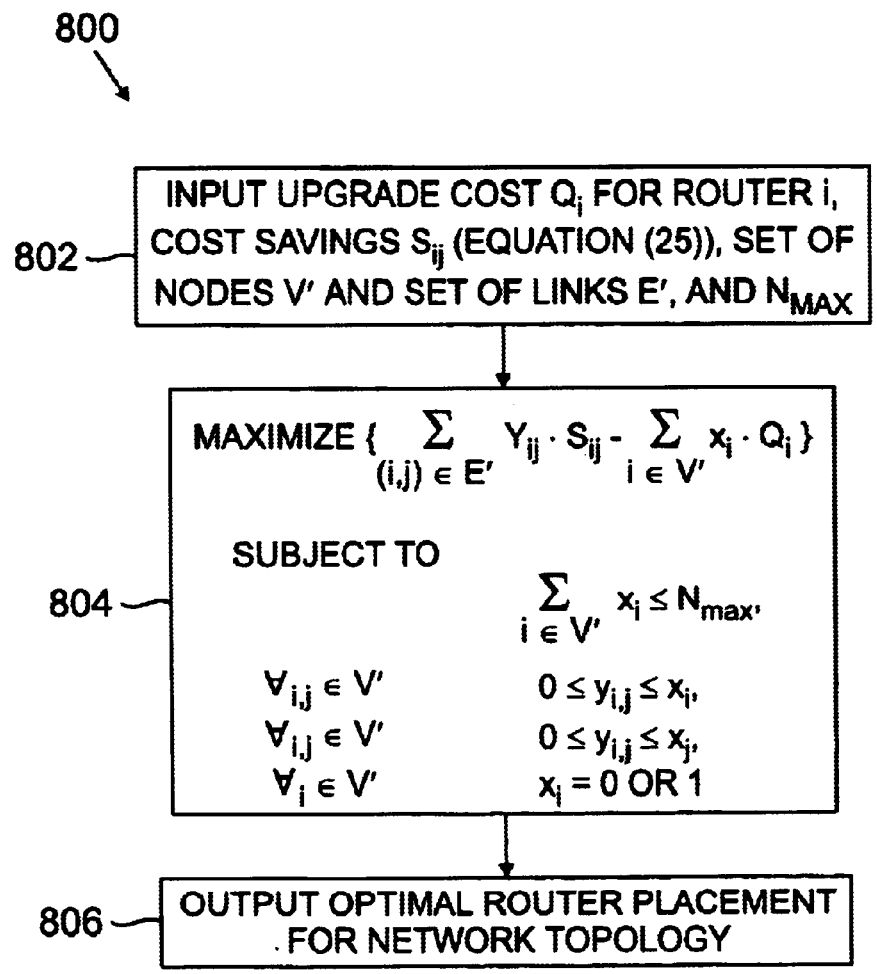
FIG. 8 is a flow chart of a method of determining placement of routers in a network according to an embodiment of the present invention.

In the link deloading embodiment, the approach is to start with the full topology G and then try to improve the network cost by removing some lightly loaded links to yield the final topology. Due to the use of unique shortest path routing, all the trunks in a link are removed in order to change the routing pattern in the network. Referring now to FIG. 7, a method of deloading links according to the invention is shown. First, the candidate links to be deloaded are identified, in step 702, based on the flow of traffic they carry and a tunable utilization threshold $\text{Thd}_{deload}$. Specifically, for the case of the FIFO/RED router networks, a link l is a candidate to be deloaded if $$\left( \overline{c}_l^{FIFO}(\{H\}) + \sum_{i \in Fl} d_i^{UDP} \right)$$

$\leq (\text{Thd}_{deload} * \text{unit trunk capacity})$. For links in a WFQ/LQD router network, the corresponding criteria is $$\sum_{i \in Fl} d_i \leq (Thd_{deload} * \text{unit trunk capacity}).$$

Once the candidate links are selected, they are ordered according to their potential impact on the existing network design when the traffic carried by them is re-routed (step 702). For this purpose, provided the candidate list is not empty (step 704), the sum of the product of the demand and hop-count of flows traversing each candidate link are computed, in step 708. Next, in step 710, the candidate link with the smallest sum of the product is tentatively removed from the network topology. The motivation is to minimize the topology/capacity perturbation during deloading to avoid rapid changes in network cost. After a candidate link is tentatively removed, the new routes, capacity requirements, and the resulting network cost are re-computed, in step 712. If the link removal yields a reduction in network cost, the link is permanently removed in step 716. However, if the link removal does not yield a reduction in network cost, this current candidate link is kept in the topology but removed from the candidate list (step 718). The deloading process is then repeated (with the updated topology if the previous candidate was removed or the same topology if the candidate was kept) for the next candidate link with the smallest sum of the product in the list (step 704). If the candidate list is empty, the deloading process is completed (block 706).

It is to be further appreciated that various variants of the topology optimization heuristics discussed in Section 2.0 have been implemented and tested. For instance, we have tried different orderings in which stragglers are routed, as well as the combined use of the augmentation approach with the link-deloading approach. That is, it is to be appreciated that the link-deloading approach may be used as a stand-alone optimization method or it can be used in conjunction with the augmentation method, e.g., the link-deloading method can follow the augmentation method. The resulting performance is presented in Section 4.0 where different case studies are discussed.

In the augmentation approach for topology optimization, the cost of the network configurations generated during the intermediate iterations is not explicitly considered. However, the minimization of network cost is implicitly done via traffic packing and topology augmentation. This is based on the observation that network cost can be reduced by packing small demands on the spare capacity of some existing links rather than introducing additional poorly utilized links.

It is to be appreciated that when additional capacity is needed on a link to accommodate a new straggler in the augmentation approach, the actual required capacity can be computed in a straightforward, simple-additive manner for the case of WFQ/LQD routers. However, in the case of FIFO/RED router networks, the deloading approach is preferred because the link capacity requirement as shown in Section 1.0 can vary considerably when the traffic mix on a link changes.

Also, it is to be appreciated that, with demand routing based on shortest path, there is a subtle difference between a link which has no spare capacity and one which is assigned a total capacity of zero. The routes of the demands in these two cases can be significantly different and needed to be distinguished.

Accordingly, given the implementation of any of the illustrative embodiments of network topology optimization explained above, the output of the optimization processor 18 (denoted as reference designation C in FIG. 1) is a network topology that is preferably provided to the worst-case link capacity requirements processor 14, through the routing processor 12, which then computes link capacity requirements given the topology received, as explained above. Then, as explained in the context of FIG. 2, it is determined if this is the final topology which meets the designers criteria, e.g., due to network cost or validation considerations. If not, the optimization process (whichever one is implemented) is repeated until the final network topology is formulated.

3.0 Router Replacement

Assume an existing IP network which uses only legacy FIFO/RED routers. Let the network be represented by an undirected simple graph $G_s=(V',E')$ where V' is the set of nodes corresponding to the set of routers and E' is the set of links connecting the routers. Here, we consider the following problem $\mathcal{P}$: Given a maximum of $N_{max}$ WFQ/LQD routers which can be used for one-to-one replacement of any FIFO/RED routers in V', find the set of FIFO/RED routers to be replaced so that the network cost savings are maximized.

Let $T^{FIFO}(C)$ and $T^{WFQ}(C)$ be the termination cost for a FIFO/RED router and a WFQ/LQD router, respectively, to terminate a link of capacity C. Let M (C, L) be the mileage cost of a link of capacity C and length L, regardless of what type of routers are used. By replacing some of the FIFO/RED routers in the existing network by WFQ/LQD routers, the resultant changes in the overall network cost can be divided into 2 separate components. First, there are the expenses related to the upgrade of the selected FIFO/RED routers to WFQ/LQD routers. Second, there are the cost savings derived from reduction in transmission capacity requirements when FIFO/RED scheduling and buffer management in legacy routers is replaced with WFQ/LQD in advanced next-generation routers. To understand the detail savings/expenses involved in the replacement process, the present invention provides the following 2-step process. First, we perform a one-for-one replacement of a selected set of FIFO/RED routers using WFQ/LQD routers which have the same number of interfaces and termination capacity of the routers they replace. Denote such replacement cost for a selected FIFO/RED router i by $Q_i$. Second, for a transmission link $l=(i,j)$ connecting FIFO/RED routers i and j, if both i and j are replaced by WFQ/LQD routers, the capacity requirement of link l is reduced due to improved packet-scheduling and router-buffer management. As a result, cost savings can be derived from (i) getting a "refund" of the extra interfaces/termination-capacity on the newly placed WFQ/LQD routers and (ii) reduction in mileage cost associated with link l. Specifically, if and only if we replace both of the terminating routers i and j of link $l=(i,j)$ with WFQ/LQD routers, we can realize savings of $S_{i,j}$ given by:

$$S_{i,j} = \{M(C_l^{FIFO}, L_l) + T^{WFQ}(C_l^{FIFO}) - M(C_l^{WQF}, L_l) - T^{WFQ}(C_l^{WFQ})\} \quad (22)$$

where $C_l^{FIFO}$ and $C_l^{WFQ}$ are the corresponding capacity requirements for the FIFO/RED and WFQ/LQD case. Note that $S_{i,j}$ is a conservative estimate of the actual savings derived from such replacement because it only considers the impact of the capacity requirement on an isolated link-by-link basis. It is possible that extra capacity reduction may be achieved elsewhere in the network when WFQ/LQD routers are added due to their tighter bandwidth control on flows passing through link l.

Advantageously, based on the framework described above, problem $\mathcal{P}$ can be formulated, according to the invention, as the following mixed integer programming (MIP) problem:

$$\text{maximize} \left\{ \sum_{(i,j) \in E'} y_{i,j} \cdot S_{i,j} - \sum_{i \in V'} x_i \cdot Q_i \right\}$$

$$\text{subject to} \quad \sum_{i \in V'} x_i \le N_{\max},$$

$$\forall i, j \in V', \quad 0 \le y_{i,j} \le x_i, \quad (a)$$
$$\forall i, j \in V', \quad 0 \le y_{i,j} \le x_j, \quad (b)$$
$$\forall i \in V', \quad x_i = 0 \text{ or } 1, \quad (c)$$

where $Q_i$ is the upgrade cost for router i as described above. $S_{i,j}$ in equation (22) with the understanding that $S_{i,j}=0$ if $(i,j) \notin E'$ or $i=j$. $x_i$ is a binary decision variable such that $x_i=1$ if and only if router i is selected to be replaced by a WFQ/LQD router. $y_{i,j}$ is a dependent variable to reflect the realization of cost savings associated with link $l=(i,j)$: according to the constraints specified by constraints (a) and (b), $y_{i,j}$ if both $x_i=1$ and $x_j=1$. Otherwise, $y_{i,j}=0$. This corresponds to the fact that cost savings can only be realized when both ends of a link are connected to a WFQ/LQD router. Note that there is no need to specify $y_{i,j}$ as binary variables because with $S_{i,j} \ge 0$, the maximization of the objective function will automatically force $y_{i,j}$ to become 1 if permitted by the values of $x_i$ and $x_j$ based on the constraints (a) and (b). Otherwise, $y_{i,j}$ will be forced to 0 by the constraints anyway. $N_{max}$ is an input parameter specifying the maximum number of FIFO/RED routers allowed to be replaced. If $N_{max}$ is set to $|V|$, the solution of this MIP problem will determine both the optimal number of routers to be replaced as well as the corresponding replacement locations.

Based on the above MIP formulation, the router replacement processor 20 implements an optimal router replacement software program using standard MIP optimization packages. For example, such standard MIP optimization packages which may be used include: AMPL, as is known in the art and described in R. Fourer, D. M. Gay and B. W. Kernighan, "AMPL—A Modeling Language For Mathematical Programming," Boyd & Fraser Publishing Company (1993); and CPLEX Mixed Integer Solver from the CPLEX division of ILOG$_s$ Inc. When running on a 333-MHZ Pentium II PC, the optimal placement of WFQ/LQD routers in a large legacy FIFO/RED network with about 100 nodes and 300 links can be determined within seconds.

4.0 Case Studies

Figure 9:
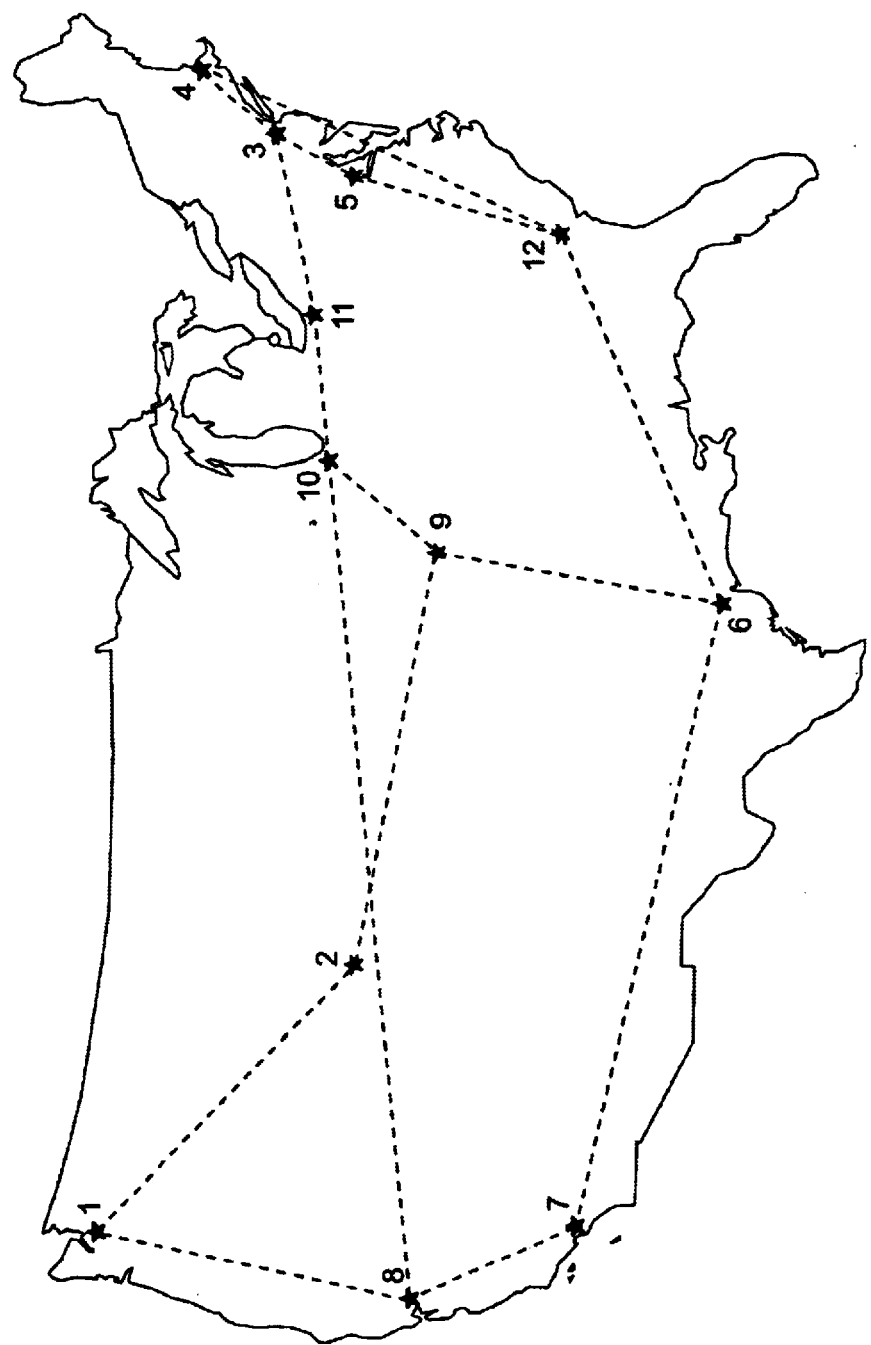
FIG. 9 is a diagram of an exemplary network topology for implementing the present invention.

In this section, the results of some case studies (examples) regarding IP network capacity assignment and optimal router replacement according to the invention are discussed. The first case study is based on the topology of NSFNET at the end of 1994. FIG. 9 shows this topology which may be used as the full topology G in the design framework of the invention. The trunk size is set to 240 units throughout the network. FIG. 10A gives the matrix whose entries are the corresponding point-to-point traffic demand used for the example. The relative magnitudes of the traffic demands are set according to 1994 statistics reported in Merit Network Information Center Services, "Statistical Reports Pertaining to the NSFNET Backbone Networks," (1994), using the scaling method proposed in R. H. Hwang, "Routing in High-speed Networks," PhD. dissertation, University of Massachusetts at Amherst (May 1993). We have also scaled up the absolute volume of each demand to reflect the growth of demand since 1994. The overall network cost J is computed based on some arbitrary termination cost per trunk and some arbitrary mileage cost per unit length. The termination and mileage costs are assumed to be the same for FIFO/RED and WFQ/LQD routers. While designing the network, we have experimented with the various topology optimization strategies and different network congestion assumptions described in the previous sections.

4.1 Design with Homogeneous Routers

First, we consider the case of homogeneous networks which use FIFO/RED routers or WFQ/LQD routers exclusively. We refer to these as the all-FIFO/RED and all-WFQ/LQD cases, respectively. For our design problem, the overall network cost is governed by two key factors, namely: (1) the final topology of the network as a result of the topology optimization heuristics; and (2) the capacity requirements of the links, which is a function of the scheduling and buffer management capabilities available in the routers. We will discuss the impact of these two factors separately in the following subsections.

4.1.1 Impact of Router Capabilities

In order to focus on the impact of router capabilities alone, we hereby use the same final topology for all the design cases. This is achieved by turning off the topology optimization module and use the initial backbone G as the final one, i.e., final $G_s=G$. As a result, the all-WFQ/LQD and all-FIFO/RED designs both have a topology identical to that shown in FIG. 9, where all the links are active. FIG. 10B summarizes the corresponding results. Note that with the same final network topology (and thus traffic routes), the cost difference between the all-WFQ/LQD and all-FIFO/RED cases is solely due to capacity savings derived from the advanced scheduling and buffer management capabilities of WFQ/LQD routers. While the cost of the all-WFQ/LQD case is invariant with respect to different network congestion scenario, the cost of the all-FIFO/RED configuration varies depending on the assumptions of network congestion scenario. The all-WFQ/LQD configuration costs less than ⅓ of the all-FIFO/RED one under the worst-case congestion scenario, i.e., based on $\overline{C}_l^{FIFO}(H^{worst})$. It still costs considerably less even when the very optimistic congestion scenario based on $H^{best}$ is assumed. Observe that there are significant cost differences for the FIFO case when different congestion scenarios are assumed ($H^{worst}$, $H^{hop}$, $H^{one}$, $H^{best}$). However, the cost difference due to multiple-bottleneck effect (between $\overline{C}_l^{FIFO}(H^{hop})$ and $\underline{C}_l^{FIFO}(H^{hop})$) as well as between $\overline{C}_l^{FIFO}(H^{one})$ and $\underline{C}_l^{FIFO}(H^{one})$) is relatively small when compared to the cost difference due to the choice of H. As mentioned above, since the congestion scenario is dynamic and unpredictable in practice, if one wants to provide deterministic guarantees on the minimum throughput under all traffic scenarios, one has little choice but to assume the worst-case scenario, i.e., $H^{worst}$ for FIFO/RED link capacity computation. FIG. 10B also includes a column called the "Network-wide Overbuild factor" denoted by κ. Given a final network topology $G_s(V', E')$ and the associated link capacities $C_l$'s for satisfying the minimum throughput requirements $d_i$'s, κ is defined as:

$$\kappa = \frac{\sum_{l \in E'} C_l}{\sum_{l \in E'} \sum_{i \in F_l} d_i} \quad (23)$$

To motivate the definition of κ, let us consider an individual link l and the corresponding ratio $$C_l \bigg/ \sum_{i \in F_l} d_i.$$

Ideally, if link capacity is available in continuous units as opposed to discrete steps of trunk size, and if ideal link bandwidth scheduling and buffer management is available, it should suffice to have $$C_l \bigg/ \sum_{i \in F_l} d_i$$

equal to one to meet minimum throughput requirements of all the demands. When the same argument is applied to all the links in the network, it is clear that the ideal (minimum) value of κ is also equal to one. Thus, κ is a measure of "capacity overbuild" due to non-ideal situations such as the discrete nature of link capacity (i.e., the need to round up to the nearest integer number of trunks) and the lack of sophisticated bandwidth scheduling and buffer management in the routers.

From FIG. 10B, one can observe that κ is slightly greater than one for the WFQ/LQD case which is merely due to the discrete nature of link capacity. On the other hand, much greater capacity overbuild is required for the FIFO/RED cases due to the lack of adequate traffic management capabilities in the FIFO/RED routers, i.e., excess link capacity is needed to overcome the inherent unfairness of TCP in order to satisfy the minimum throughput requirements.

In addition to the NSFNET backbone design, we have also conducted a similar study on the design of a large-scale carrier-class network. The results are summarized in FIG. 10C. The findings are qualitatively similar to those of the NSFNET study except that the relative cost difference between the all-FIFO/RED and all-WFQ/LQD configurations becomes even larger. This is due to the increase in size and traffic diversity in the network when compared to the NSFNET. Recall from equation (5) that with FIFO/RED routers, the capacity requirement of a link is dominated by the demand which has the maximum $$d_i \bigg/ \left( w_i \bigg/ \sum_{j \in F_l} w_j \right)$$

ratio. The bigger the network, the more diverse the end-to-end delays of traffic demands becomes, and thus the greater the maximum $$d_i \bigg/ \left( w_i \bigg/ \sum_{j \in F_l} w_j \right)$$

ratio.

4.1.2 Comparison of Topology Optimization Heuristics

We now proceed to compare the effectiveness of various topology optimization heuristics discussed in Section 2.0. Here, we use the NSFNET backbone example for illustration. FIG. 10D reports the results of various optimization options using WFQ/LQD routers exclusively. FIFO/RED router cases are not included because it is preferred that link deloading be employed in such cases. As shown in FIG. 10D, the resulting network cost based on different heuristics are very close to each other except for the "capacity-only" augmentation approach which performs considerably worse, a more than 30% increase in cost. Such performance is typical among other design cases we have tested and can be attributed to the effects of a lack of adaptation while classifying demands as keepers or stragglers: once a threshold is selected, each demand is classified and typically never converted. In the NSFNET example, the selected threshold is such that the connectivity of the subgraph $G_s$ formed by the keepers is not rich enough so that some demands have to traverse longer paths than in the case of the other more optimal topologies. One possible way to enhance the "capacity-only" augmentation approach is to try multiple thresholds and select the one which yields the lowest network cost.

For the NSFNET study, due to the sparse nature of the initial backbone G and the existence of demands for each node pair, there are few links in G which can be removed via topology optimization. As a result, the topology optimization heuristics produce a maximum cost reduction of about 3% over the non-optimized topology G. However, we have seen in other test cases the use of these topology optimization heuristics yield much higher cost savings, from about 15% to over 90%. In general, the actual savings is a strong function of the initial topology G and the distribution of traffic demands.

In terms of computational efficiency, it may be relatively more expensive to rely on link deloading only, especially when the initial backbone G has very rich connectivity and a large portion of the demands are much smaller than the trunk size. In these cases, the link-deloading-only approach tries to deload almost all of the links in G while the augmentation approach can speed-up the process by rapidly selecting a subset of links to form the "core" topology via the routing of the keepers. Finally, since link deloading typically results in equal or better network cost, it is advisable to apply it after the augmentation approach is completed. By doing so, we have observed an additional cost savings ranging from 0 to 15% in various design cases that we carried out.

To conclude this subsection, FIGS. 10E and 10F give the combined impact of topology optimization and router capabilities on network cost for the NSFNET and the carrier-class backbone examples, respectively. The network cost reported in FIGS. 10E and 10F is based on the most "optimal" topology we have found for a given configuration. Even under the most conservative assumptions, there are still substantial cost benefits of using WFQ/LQD routers instead of FIFO/RED ones.

4.2 Router Placement

Figures 10G, 10H, 11:
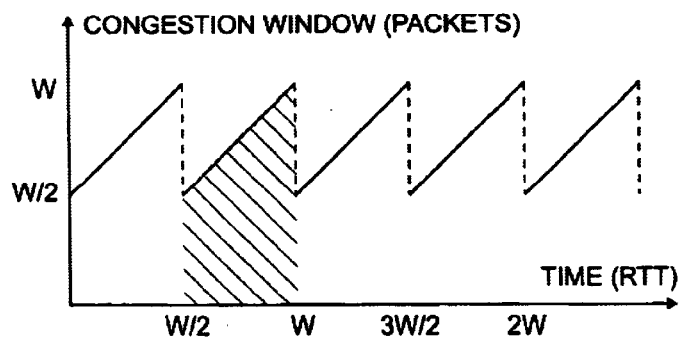

We now consider the heterogeneous case where only a fixed number N of WFQ/LQD routers can be used together with other FIFO/RED routers in building the NSFNET backbone described above. Based on the WFQ/LQD router placement approach described in Section 3.0, FIG. 10G shows the optimal locations for WFQ/LQD routers as N varies. The corresponding network cost based on $\overline{C}_l^{FIFO}(H^{worst})$ is also computed. Due to the assumption of bi-directional traffic demand, at least two WFQ/LQD routers are required to result in any capacity (and thus cost) savings. Let us use the cost for the all-FIFO/RED configuration as the baseline. The first pair of WFQ/LQD routers, when optimally placed, can yield a cost savings of about 12.1% This is achieved by reducing the capacity requirement of a single long-haul link between node 8 (San Francisco) and node 10 (Chicago). This link results in the most significant savings due to its large absolute capacity (in terms of absolute number of trunks) and high mileage. As more WFQ/LQD routers are optimally placed, they form a cluster between the links which have large absolute capacities with large over-build factor due to the large maximum $$d_i \bigg/ \bigg( w_i \bigg/ \sum_{j \in F_l} w_j \bigg)$$

ratio of the traffic carried by the links.

We have also conducted a similar router placement study for the carrier-class network example. FIG. 10H shows the corresponding cost reductions when different portions of the routers in the all-FIFO/RED configuration are replaced with optimally located WFQ/LQD routers. Initially, when 10% of the FIFO/RED routers are optimally replaced by WFQ/LQD routers, there is about 15% reduction in network cost. Again, the large cost reduction is due to large capacity reduction of expensive (long-haul) links. When the fraction of WFQ/LQD routers increases to 20% and subsequently to 30%, the cost reduction is still considerable. This is due to the formation of WFQ/LQD clusters which rapidly increases the number of "beneficiary" links, i.e., the intra-cluster and inter-cluster ones. Afterwards, the cost reduction rate gradually levels off as most of the biggest savings have been extracted via earlier optimization.

5.0 Throughput Allocation Under FIFO/RED

With reference to Subsection 1.1 above, the assumptions used in M. Mathis, J. Semke, J. Mahdavi, and T. Ott, "The Macroscopic Behavior of the TCP Congestion Avoidance Algorithm," ACM Computer Comm. Review, Vol. 27, No. 3, pp. 67–82 (July 1997) to compute the throughput of a TCP connection are:

(i) Links operate under light to moderate packet losses so that TCP's dynamic window mechanism is mainly governed by the congestion avoidance regime where the congestion window is halved when a packet loss is detected. Note that under heavy loss conditions, TCP's window flow control may experience timeouts which make the window decrease to a value of one packet followed by a slow-start mode.

(ii) Packet losses along the path of the connection are represented by a constant loss probability p with the assumption that one packet drop takes place every 1/p packets transmitted.

Under these assumptions, the connection's congestion window behaves as a periodic sawtooth as shown in FIG. 11. In FIG. 11, it is assumed that the maximum window size $W_{max}$ is large enough so that the congestion window does not reach saturation ($W \leq W_{max}$). If the receiver acknowledges every packet, the window opens by one every round trip time (which implies that the slope in FIG. 11 is equal to one) and each cycle lasts W/2 round trips ($\tau \cdot W/2$). The number of packets transmitted per cycle is given by the area under the sawtooth, which is:

$$\left(\frac{W}{2}\right)^2 + \frac{1}{2}\left(\frac{W}{2}\right)^2 = \frac{3}{8}W^2$$

Under assumption (ii), this is also equal to 1/p which implies that:

$$W = \sqrt{\frac{8}{3 \cdot p}}.$$

The TCP connection's throughput is then given by:

$$r = \frac{\text{packets per cycle}}{\text{time per cycle}} = \frac{\frac{3}{8}W^2}{\tau\frac{W}{2}} = \frac{\sqrt{\frac{3}{2}}}{\tau\sqrt{p}} \frac{pkts}{\sec} \quad (24)$$

In order to compute the throughput of each connection i in the set $F_l$ of all TCP connections routed through link l, we make the following assumption:

(iii) Let S be the set of congested links and $X_j$ be the process of packet drops at link j. It is assumed that $X_j$, j∈S, are independent and each is represented by the same loss probability $p^o$. A similar assumption is also used in S. Floyd, "Connections with Multiple Congested Gateways in Packet-Switched Networks Part 1: One-way Traffic," ACM Computer Comm. Review, Vol. 21, No. 5, pp. 30–47 (October 1991) to compute TCP throughput in a linear topology of n links and n+1 connections made up of one n-hop connection traversing all n links and one one-hop connection per link so that each link is traversed by two connections.

Under this assumption, the path loss probability for connection i is given by:

$$p_i = 1 - (1-p^o)^{h_i} \quad (25)$$

where $h_i$ is the number of congested hops in the path of the TCP connection. Indeed, let $j_i, j_2, \ldots, j_{hi}$ be the ordered set of congested links in the path of connection i with $j_1$ and $j_{hi}$ being the first and last congested links traversed by connection i, respectively. If N packets of connection i are transmitted at the source, then $p^o N$ are dropped at link $j_1$ and $(1-p^o)$ N are successfully transmitted. Out of the $(1-p^o)$ N packets that arrive at link $j_2$, $p^o (1-p^o)$ N are dropped and $(1-p^o)^2$ N are successfully transmitted. By a simple induction argument, it can be easily shown that $(1-p^o)^{hi-1}$ N make it to link $j_{hi}$ out of which $p^o (1-p^o)^{hi-1}$N are dropped and $(1-p^o)^{hi}$ N are delivered. Therefore, the total number of packets lost is $N-(1-p^o)^{hi}$ N which correspond to a loss ratio given in equation (25). For small values of the loss probability $p^o$, $p_i$ is equal to $h_i \cdot p^o$ when high order terms of $p^o$ in equation (25) are neglected. Substituting in equation (24) we obtain:

$$r_i = \frac{\sqrt{\frac{3}{2}}}{\tau_i \sqrt{h_i} \sqrt{p^0}} = \delta \cdot w_i \text{ where:} \quad (26)$$

$$\delta = \frac{\sqrt{\frac{3}{2}}}{\sqrt{p^0}} \text{ and } w_i = \frac{1}{\tau_i \sqrt{h_i}}.$$

For a given link l∈S with capacity $c_l^{FIFO}$, let $r_i^l$ be the throughput share of TCP connection i∈$F_l$. If we ignore the multiple bottleneck effect discussed and taken into account in Subsection 1.1 above and focus on link l only, we can treat $r_i$ in equation (26) as being $r_i^l$ and have:

$$\sum_{i \in F_l} r_i^l = \sum_{i \in F_l} \delta \cdot w_i = c_l^{FIFO} \quad (27)$$

Obviously, the link buffer has to be large enough (of the order of bandwidth-delay product) to be able to achieve an aggregate throughput of $c_l^{FIFO}$ as in equation (27). If this is not the case the link may be underutilized. From equation (27) we obtain the value of δ as:

$$\delta = \frac{c_l^{FIFO}}{\sum_{i \in F_l} w_i}$$

and the throughput share of connection i as:

$$r_i^l = \delta \cdot w_i = \frac{w_i}{\sum_{j \in F_l} w_j} c_l^{FIFO} \quad (28)$$

Simulations are used in the above-referenced Mathis et al. article to validate the result in equation (24). In the above-referenced Floyd article, a different approach is used to derive and validate through simulations a similar result for the special case mentioned above with two connections per link. However, the result we obtained in equation (28) is a generalization to arbitrary topology with arbitrary TCP traffic pattern and recognizes the weighted nature of the throughput allocation.

6.0 NP-hardness of the Router Replacement Embodiment

Consider the following graph problem P(G, N): Given an undirected simple weighted graph G=(V, E, S) where S is a |V|×|V| weight matrix with entries $S_{i,j}$ corresponding to node pair i, j∈V such that:

$$S_{i,j} = \begin{cases} 0 & \text{if } (i, j) \notin E \text{ or } i = j \\ M(C_l^{FIFO}, L_l) + T(C_l^{FIFO}) - M(C_l^{WFQ}, L_l) - T(C_l^{WFQ}) & \text{otherwise.} \end{cases}$$

A savings of $S_{i,j}$ if both of nodes i and j are selected. The objective is to maximize savings while keeping the total number of selected nodes to be less than or equal to N. It is clear that the above graph problem P(G, N) is a specialized version of the problem $\mathcal{P}$ described in Section 3.0 by setting all $Q_i$'s in $\mathcal{P}$ of Section 3.0 to zeros. The selection of nodes in P(G, N) corresponds to choice of FIFO/RED locations for WFQ/LQD upgrade.

Since P(G, N) is a special case of $\mathcal{P}$, it suffices to show that P($G_s$, N) is NP-hard in order to prove that $\mathcal{P}$ is NP-hard. The proof of P(G, N) being NP-hard is through the reduction of the decision-version of the NP-complete maximum clique problem to an instance of P(G, N). The clique problem is known in the art, for example, as described in M. R. Garey and D. S. Johnson, "Computers and Intractability: A Guide to the Theory of NP-Completeness," Freeman (1979) and C. H. Papadimitriou et al., "Combinatorial Optimization: Algorithms and Complexity," Prentice Hall (1982). The decision-version of the maximum clique problem Q(G, N) can be stated as follows: Given an undirected simple graph G=(V, E) and a positive integer N, does there exist a subgraph $G_s$=(V', E') of G such that |V'|=N and for all distinct i, j∈V', (i,j)∈E?

To prove P(G, N) to be NP-hard, we can reduce Q(G, N) into an instance of P(G, N) by setting:

$$S_{i,j} = \begin{cases} 0 & \text{if } (i, j) \in E \text{ and } i \neq j \\ 1 & \text{otherwise.} \end{cases}$$

It is evident that Q(G, N) has a "yes" answer if and only if the maximum savings derived from P(G,N) is equal to N (N−1)/2 and this completes the reduction.

The problem $\mathcal{P}$ can also be transformed into a generalized knapsack problem using the following steps. First, set the size of knapsack to $N_{max}$ and treat the FIFO/RED routers in G as items to be packed where every item is of size 1. Second, assign to any pair of items (i,j) a utility value $S_{i,j}$ which can be realized if and only if both item i and j are packed into the knapsack. Third, for each item i, there is an associated penalty $Q_i$ if it is packed into the knapsack. Define the total utility value for a chosen set of items to be the sum of the pairwise utility values $S_{i,j}$'s minus the sum of the penalties $Q_i$'s of the set. The selection of the optimal set of FIFO/RED routers to be replaced then becomes the selection of a set of items to be packed given the knapsack size constraint while maximizing the total utility value.

Thus, as explained, the need for providing performance guarantees in IP-based networks is more and more critical as a number of carriers are turning to packing IP directly on SONET to provide backbone Internet connectivity. Advantageously, the present invention provides network design and capacity optimization algorithms to address these and other issues. Also, the present invention provides algorithms that yield designs for both the homogeneous case (all-WFQ/LQD or all-FIFO/RED networks) as well as for heterogeneous networks where we solve the problem of optimal placement of WFQ/LQD routers in an embedded network of FIFO/RED routers.

It is to be appreciated that while detailed descriptions of preferred embodiments of the invention have been given above, the invention is not so limited. For instance, the network design system and methodologies of the invention may be applied to other approaches for providing VPN services such as, for example: (i) the use of the type-of-service (TOS) field in IP packets with policing at the network edge routers and marking traffic which is in excess of the VPN contract, and (ii) hybrid approaches that combine (i) and WFQ/LQD. Also, the invention may be implemented with more sophisticated routing such as, for example, loop-free non-shortest path next-hop forwarding via deflection and the use of TOS-based routing in OSPF. Further, the invention may also implement other heuristics to solve the NP-hard router-placement problem. The invention may be used for designing, for example, an infrastructure for supporting differentiated services via a two-tier network that combines a homogeneous WFQ/LQD router network with a homogeneous FIFO/RED router network. Also, the TCP throughput model may be extended to cover regimes where time-outs and/or maximum receiver/sender window size dominate, as well as to cover other types of packet scheduling such as WFQ among classes and FIFO among the flows of each class.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A processor-based method for designing a packet-based communications network, comprising the steps of:

computing a pair of link capacity values for each link to be included between nodes in a topology of the packet-based communications network, the link capacity values representing an upper bound and a lower bound of a link capacity range based on a set of flow demands, a round trip delay and a link congestion scenario associated with at least one connection requirement; and outputting the link capacity values for selection of the value at or within the upper and lower bounds for each link, which substantially satisfies the at least one connection requirements, for specification in the network topology.

2. The method of claim 1, wherein the packet-based communications network is to use a FIFO/RED scheduling/buffering scheme.

3. The method of claim 2, wherein the upper bound, $\overline{c}_l^{FIFO}$, is represented as:

$$\overline{c}_l^{FIFO}(H_l) = \max_{i \in F_l} \left\{ d_i \frac{\sum_{j \in F_l} w_j}{w_i} (H_l) \right\}$$

where $d_i$ represents a throughput associated with the flow demand, $H_l$ represents a vector of a number of congested links in a path of each flow in $F_l$, $F_l$ represents a set which contains demands routed through the link l, and w is a function of the round trip delay and the link congestion scenario.

4. The method of claim 2, wherein the lower bound, $\underline{c}_l^{FIFO}$, is represented as:

$$\underline{c}_l^{FIFO}(\{H\}) = \sum_{i \in F_l} r_i(\{H\})$$

where $r_i$ represents a link share obtained by a demand i, $\{H\}$ represents a set of $H_l$, and $F_l$ represents a set which contains demands routed through the link l.

5. The method of claim 1, wherein the link congestion scenario is selectable by a user.

6. The method of claim 1, wherein the link congestion scenario is a function of h which represents the number of congested links in a path of connection in the network.

7. The method of claim 6, wherein the link congestion scenario for the upper bound is defined as $h_i$ equal to $\overline{h}_i$ and $h_j$ equal to 1, for j not equal to i, where $h_i$ represents the number of congested links in a path of connection i in the network, $\overline{h}_i$ represents a number of hops corresponding to a shortest path associated with connection i, and $h_j$ represents the number of congested links in a path of connection j in the network.

8. The method of claim 6, wherein the link congestion scenario for the lower bound is defined as $h_j$ equal to $\overline{h}_j$ and $h_i$ equal to 1, for j not equal to i, where $h_j$ represents the number of congested links in a path of connection j in the network, $\overline{h}_j$ represents a number of hops corresponding to a shortest path associated with connection j, and $h_i$ represents the number of congested links in a path of connection i in the network.

9. The method of claim 6, wherein the link congestion scenario for a case between the upper and lower bounds is defined as $h_i$ equal to $\overline{h}_i$, where $h_i$ represents the number of congested links in a path of connection i in the network and $\overline{h}_i$ represents a number of hops corresponding to a shortest path associated with connection i.

10. The method of claim 6, wherein the link congestion scenario for a case between the upper and lower bounds is defined as $h_i$ equal to 1, where $h_i$ represents the number of congested links in a path of connection i in the network.

11. The method of claim 1, wherein the packet-based communications network is to employ an IP network protocol.

12. The method of claim 11, wherein the packet-based communications network is to employ an TCP transport protocol.

13. The method of claim 12, wherein the computation of the link capacity values accounts for TCP traffic.

14. The method of claim 11, wherein the packet-based communications network is to employ an UDP transport protocol.

15. The method of claim 14, wherein the computation of the link capacity values accounts for UDP traffic.

16. The method of claim 11, wherein the packet-based communications network is to employ an TCP and a UDP transport protocol.

17. The method of claim 16, wherein the computation of the link capacity values accounts for TCP and UDP traffic.

18. The method of claim 1, wherein the packet-based communications network is to be a virtual private network.

19. The method of claim 1, wherein the number of connections within a particular demand is greater than one.

20. Apparatus for designing a packet-based communications network, comprising:

at least one processor for computing a pair of link capacity values for each link to be included between nodes in a topology of the packet-based communications network; the link capacity values representing an upper bound and a lower bound of a link capacity range based on a set of flow demands, a round trip delay and a link congestion scenario associated with at least one connection requirement, the processor also for permitting output of the link capacity values for selection of the value at or within the upper and lower bounds for each link, which substantially satisfies the at least one connection requirements, for specification in the network topology; and memory for storing one or more of the link capacity values and selection results.

21. The apparatus of claim 20, wherein the packet-based communications network is to use a FIFO/RED scheduling/buffering scheme.

22. The apparatus of claim 21, wherein the upper bound, $\bar{c}_l^{FIFO}$, is represented as:

$$\bar{c}_l^{FIFO}(H_l) = \max_{i \in F_l}\left\{d_i \frac{\sum_{j \in F_l} w_j}{w_i}(H_l)\right\}$$

where $d_i$ represents a throughput associated with the flow demand, $H_l$ represents a vector of a number of congested links in a path of each flow in $F_l$, $F_l$ represents a set which contains demands routed through the link l, and w is a function of the round trip delay and the link congestion scenario.

23. The apparatus of claim 21, wherein the lower bound, $\underline{c}_l^{FIFO}$, is represented as:

$$\underline{c}_l^{FIFO}(\{H\}) = \sum_{i \in F_l} r_i(\{H\})$$

where $r_i$ represents a link share obtained by a demand i, $\{H\}$ represents a set of $H_l$, and $F_l$ represents a set which contains demands routed through the link l.

24. The apparatus of claim 20, wherein the link congestion scenario is selectable by a user.

25. The apparatus of claim 20, wherein the link congestion scenario is a function of h which represents the number of congested links in a path of connection in the network.

26. The apparatus of claim 25, wherein the link congestion scenario for the upper bound is defined as $h_j$ equal to $\bar{h}_j$ and $h_i$ equal to 1, for j not equal to i, where $h_i$ represents the number of congested links in a path of connection i in the network, $\bar{h}_i$ represents a number of hops corresponding to a shortest path associated with connection i, and $h_j$ represents the number of congested links in a path of connection j in the network.

27. The apparatus of claim 25, wherein the link congestion scenario for the lower bound is defined as $h_j$ equal to $\bar{h}_j$ and $h_i$ equal to 1, for j not equal to i, where $h_j$ represents the number of congested links in a path of connection j in the network, $\bar{h}_j$ represents a number of hops corresponding to a shortest path associated with connection j, and $h_i$ represents the number of congested links in a path of connection i in the network.

28. The apparatus of claim 25, wherein the link congestion scenario for a case between the upper and lower bounds is defined as $h_i$ equal to $\bar{h}_i$, where $h_i$ represents the number of congested links in a path of connection i in the network and $\bar{h}_i$ represents a number of hops corresponding to a shortest path associated with connection i.

29. The apparatus of claim 25, wherein the link congestion scenario for a case between the upper and lower bounds is defined as $h_i$ equal to 1, where $h_i$ represents the number of congested links in a path of connection i in the network.

30. The apparatus of claim 20, wherein the packet-based communications network is to employ an IP network protocol.

31. The apparatus of claim 30, wherein the packet-based communications network is to employ an TCP transport protocol.

32. The apparatus of claim 31, wherein the computation of the link capacity values accounts for TCP traffic.

33. The apparatus of claim 30, wherein the packet-based communications network is to employ an UDP transport protocol.

34. The apparatus of claim 33, wherein the computation of the link capacity values accounts for UDP traffic.

35. The apparatus of claim 30, wherein the packet-based communications network is to employ an TCP and a UDP transport protocol.

36. The apparatus of claim 35, wherein the computation of the link capacity values accounts for TCP and UDP traffic.

37. The apparatus of claim 20, wherein the packet-based communications network is to be a virtual private network.

38. The apparatus of claim 20, wherein the number of connections within a particular demand is greater than one.

39. An article of manufacture comprising a machine readable medium containing one or more programs which when executed implement the steps of:

computing a pair of link capacity values for each link to be included between nodes in a topology of a packet-based communications network, the link capacity values representing an upper bound and a lower bound of a link capacity range based on a set of flow demands, a round trip delay and a link congestion scenario associated with at least one connection requirement; and outputting the link capacity values for selection of the value at or within the upper and lower bounds for each link, which substantially satisfies the at least one connection requirements, for specification in the network topology.

40. A processor-based method for designing a packet-based communications network, comprising the steps of:

setting a scheduler weight and a buffer allocation at each link to be included between nodes in a topology of the packet-based communications network; and computing a link capacity value for each link, each link capacity value being a sum of a throughput of flow demands associated with at least one connection.

41. Apparatus for designing a packet-based communications network, comprising the steps of:

at least one processor for setting a scheduler weight and a buffer allocation at each link to be included between nodes in a topology of the packet-based communications network, the processor also for computing a link capacity value for each link, each link capacity value being a sum of a throughput of flow demands associated with at least one connection; and memory for storing one or more of the scheduler weight, the buffer allocation, and the link capacity value for each link.

42. An article of manufacture for designing a packet-based communications network comprising a machine readable medium containing one or more programs which when executed implement the steps of:

setting a scheduler weight and a buffer allocation at each link to be included between nodes in a topology of the packet-based communications network; and computing a link capacity value for each link, each link capacity value being a sum of a throughput of flow demands associated with at least one connection.

* * * * *